United States Patent
Karsi et al.

(10) Patent No.: US 9,780,854 B2
(45) Date of Patent: Oct. 3, 2017

(54) MULTI-LAYER WIRELESS STREAMING WITH ADAPTIVE CONSTELLATION MAPPING (ACM)

(71) Applicant: Taiwan Semiconductor Manufacturing Co., Ltd., Hsinchu (TW)

(72) Inventors: Murat Karsi, San Diego, CA (US); David Gell, San Diego, CA (US); Michel Fattouche, Calgary (CA)

(73) Assignee: Taiwan Semiconductor Manufacturing Co., Ltd., Hsinchu (TW)

(*) Notice: Subject to any disclaimer, the term of this patent is extended or adjusted under 35 U.S.C. 154(b) by 0 days.

(21) Appl. No.: 15/085,758

(22) Filed: Mar. 30, 2016

(65) Prior Publication Data

US 2016/0294460 A1    Oct. 6, 2016

Related U.S. Application Data

(60) Provisional application No. 62/140,410, filed on Mar. 30, 2015, provisional application No. 62/182,335, filed on Jun. 19, 2015.

(51) Int. Cl.
*H04B 7/02* (2017.01)
*H04B 7/06* (2006.01)
*H04B 7/024* (2017.01)

(52) U.S. Cl.
CPC ........... *H04B 7/0608* (2013.01); *H04B 7/024* (2013.01); *H04B 7/061* (2013.01)

(58) Field of Classification Search
CPC ... H04B 1/00; H04B 7/02; H04B 7/06; H04B 7/08; H04B 7/0608; H04B 7/0805;
(Continued)

(56) References Cited

U.S. PATENT DOCUMENTS

| | | | |
|---|---|---|---|
| 4,615,011 | A | 9/1986 | Linkser |
| 5,353,229 | A | 10/1994 | Tanaka |

(Continued)

FOREIGN PATENT DOCUMENTS

| | | |
|---|---|---|
| EP | 2750475 A1 | 7/2014 |
| WO | 2011/088465 A1 | 7/2011 |

(Continued)

OTHER PUBLICATIONS

Baker. "From Macro to Small Cells: Enhancements for Small Cells in 3GPP." Alcatel-Lucent. Small Cells Summit 2013, London, UK, 12 pages.

(Continued)

*Primary Examiner* — Shawkat M Ali
(74) *Attorney, Agent, or Firm* — Jianq Chyun IP Office

(57) ABSTRACT

Systems and method for adaptive constellation mapping determine transmission formats for simultaneous transmission from multiple transmitter chains. The adaptive constellation mapping can select a winning combination of mappings using distance metrics. The distance metrics can be calculated from estimated received signal constellations at a multi-layer receiver. The multi-layer receiver can separate the data received from each of the transmitter chains. Additional systems and method can determine a whether to use adaptive constellation mapping or an alternate transmission format. Further systems and methods can determine a transmit arrangement that include selection of which of multiple transmitters will be a part of an adaptive constellation mapping transmission, the number of layers that will be transmitted by each transmitter, the transmitter chains that will be used, and which of multiple antennas that will be used.

18 Claims, 9 Drawing Sheets

(58) Field of Classification Search
CPC ......... H04B 15/00; H04B 17/00; H04J 11/00;
H04J 11/0056; H04L 1/02; H04L 5/00;
H04L 5/006; H04L 5/0023; H04L
25/0242; H04L 27/06; H04L 27/14; H04L
27/16; H04L 27/22; H04W 4/00; H04W
24/02; H04W 72/04; H04W 72/12
USPC ........ 370/203, 208, 252, 319, 329; 375/219,
375/259, 260, 265, 267, 295, 316, 324,
375/341; 455/63.1, 67.14, 296, 450;
714/786, 794
See application file for complete search history.

(56) References Cited

U.S. PATENT DOCUMENTS

| | | | |
|---|---|---|---|
| 5,410,496 | A | 4/1995 | Bolon |
| 6,108,658 | A | 8/2000 | Lindsay |
| 6,587,451 | B1 | 7/2003 | Kwon |
| 7,095,812 | B2* | 8/2006 | Chan ............... H04L 1/005 375/262 |
| 7,321,644 | B2* | 1/2008 | Love ............... H04L 1/005 375/341 |
| 7,418,050 | B1* | 8/2008 | Gardner ........... H04B 7/0697 375/265 |
| 7,433,432 | B2* | 10/2008 | Hoo ............... H04B 7/0413 370/203 |
| 8,204,442 | B2 | 6/2012 | Sankar et al. |
| 9,137,688 | B2 | 9/2015 | Karsi |
| 2004/0192216 | A1* | 9/2004 | Marzetta ......... H04B 7/0413 455/67.14 |
| 2005/0141644 | A1* | 6/2005 | Sadowsky ....... H04L 25/03216 375/324 |
| 2007/0129992 | A1 | 6/2007 | Kasper |
| 2008/0051087 | A1 | 2/2008 | Ryu et al. |
| 2008/0056396 | A1* | 3/2008 | Li ............... H04L 25/0242 375/260 |
| 2008/0089297 | A1 | 4/2008 | Seo |
| 2008/0117833 | A1 | 5/2008 | Borran et al. |
| 2008/0279299 | A1* | 11/2008 | Reuven ........... H04L 25/03318 375/267 |
| 2010/0087221 | A1 | 4/2010 | Srinivasan et al. |
| 2010/0329378 | A1* | 12/2010 | Leung ............. H04B 7/0697 375/267 |
| 2011/0065447 | A1 | 3/2011 | Hahm et al. |
| 2011/0124289 | A1 | 5/2011 | Balachandran |
| 2011/0150114 | A1 | 6/2011 | Miao |
| 2011/0201341 | A1 | 8/2011 | Choudhury et al. |
| 2011/0286341 | A1 | 11/2011 | Sanayei |
| 2012/0023149 | A1 | 1/2012 | Kinsman |
| 2012/0140612 | A1* | 6/2012 | Petrov ............. H04J 11/0063 370/207 |
| 2013/0121438 | A1* | 5/2013 | Murakami ....... H04B 7/0456 375/295 |
| 2014/0180957 | A1 | 6/2014 | Arunapuram |
| 2014/0185716 | A1* | 7/2014 | Aubert ........... H04L 25/03216 375/341 |
| 2014/0274096 | A1 | 9/2014 | Stanwood et al. |
| 2014/0286269 | A1 | 9/2014 | Stanwood et al. |
| 2014/0286270 | A1 | 9/2014 | Karsi et al. |
| 2015/0081048 | A1 | 3/2015 | Tokito |
| 2015/0280888 | A1 | 10/2015 | Karsi et al. |

FOREIGN PATENT DOCUMENTS

| | | |
|---|---|---|
| WO | 2011/159042 A2 | 12/2011 |
| WO | 2012/139624 A1 | 10/2012 |
| WO | 2013/029413 A1 | 3/2013 |
| WO | 2013/069627 A1 | 5/2013 |

OTHER PUBLICATIONS

Boudreau et al. "Interference Coordination and Cancellation for 4G Networks." LTE Part II: 3GPP Release 8. IEEE Communications Magazine, Apr. 2009 (pp. 74-81).

Brück. "3G/4G Mobile Communications Systems." Qualcomm Corporate R&D Center Germany. Mar. 5, 2012, 19 pages.
Du et al. "Channel Estimation for D-BLAST OFDM Systems." School of Electrical and Computer Engineering, Georgia Institute of Technology, Atlanta, GA. Nov. 2002, 5 pages.
Exploring the World of Wireless LTE-Advanced and Coordinated Multi-Point (COMP): What Goes Around, Comes Around. Special Preview Edition. Signals Ahead. 8(5):Apr. 16, 2012.
Hou et al. "Unified View of Channel Estimation in MIMO-OFDM Systems." IEEE 2005, pp. 34-38.
International Search Report and Written Opinion for PCT/US2014/041411, mailed on Sep. 23, 2014, in 10 pages.
International Search Report and Written opinion for related PCT/US2014/024150, mailed Jun. 12, 2014, in 17 pages.
Jia-Ming et al. "A New Channel Estimation Model in OFDM System Based on Improved Pilot Training Sequence." 2004 4th International Conference on Microwave and Millimeter Wave Technology Proceedings. pp. 846-849.
Kottkamp et al. "LTE-Advanced Technology Introduction White Paper." Rohde & Schwarz. Aug. 2012, 41 pages.
Lee et al. "Coordinated Multipoint Transmission and Reception in LTE-Advanced Systems." IEEE Communications Magazine, Nov. 2012 (pp. 44-50).
Lee et al. "Coordinated Multipoint Transmission and Reception in LTE-Advanced: Deployment Scenarios and Operational Challenges." IEEE Communications Magazine, Feb. 2012 (pp. 148-155).
Léost et al. "Interference Rejection Combining in LTE Networks." Bell Labs Technical Journal. 17(1):25-50 (2012).
Li et al. "Channel Estimation for OFDM Systems with Transmitter Diversity in Mobile Wireless Channels." IEEE Journal on Selected Areas in Communications. 17(3):461-471 (Mar. 1999).
Li et al. "Simplified Channel Estimation for OFDM Systems With Multiple Transmit Antennas." IEEE Transactions on Wireless Communications. 1(1):67-75 (Jan. 2002).
Määttänen et al. "System-level performance of LTE-Advanced with joint transmission and dynamic point selection schemes." EURASIP Journal on Advances in Signal Processing 2012, 2012:247 (37 pages).
Nokia. "DL CoMP phase2 simulation results." 3GPP TSG-RAN WG1 Meeting #66, R1-112384. Athens, Greece, Aug. 22-26, 2011. 5 pages.
Nokia. "On cell-edge enhancements via inter-cell orthogonal DM RS." 3GPP TSG-RAN WG1 Meeting #66, R1-112394, Athens, Greece, Aug. 22-26, 2011. 3 pages.
Ozdemir et al. "Channel Estimation for Wireless OFDM Systems." IEEE Communications Surveys & Tutorials. 9(2):18-48 (2nd Quarter 2007).
Panasonic. "Uplink enhancement for Rel.11." 3GPP TSG-RAN WG1 Meeting #66, R1-112367. Athens, Greece, Aug. 22-26, 2011. 4 pages.
Pauli et al. "Heterogeneous LTE Networks and Inter-Cell Interference Coordination." Novel Mobile Radio Research. Dec. 2010, 9 pages.
Pauli et al. "Inter-Cell Interference Coordination for LTE-A." Novel Mobile Radio Research. Sep. 2011, 7 pages.
Rayal. "An overview of the LTE physical layer." EE Times. May 24, 2010.
Roessler et al. "LTE-Advanced (3GPP Rel.11) Technology Introduction White Paper." Rohde & Schwarz. Jul. 2013, 39 pages.
Samsung. "UL DMRS Enhancements in Rel.11." 3GPP TSG RAN WG1 #66, R1-112520, Athens, Greece, Aug. 22-26, 2011. 3 pages.
Sawahashi et al. "Coordinated Multipoint Transmission/Reception Techniques for LTE-Advanced." IEEE Wireless Communications, Jun. 2010 (pp. 26-34).
Taoka et al. "MIMO and CoMP in LTE-Advanced." NTT DOCOMO Technical Journal. 12(2)20-28, Sep. 2010.
Wild et al. "Joint Channel Estimation across Multiple Cells in Coordinated Multi-Point." IEEE 2012, pp. 845-849.
Lu et al. "Optimal Beanforming and Scheduling for MIMO-OFDM Uplink Transmissions in Hierarchical Cognitive Radio Systems."

(56) References Cited

OTHER PUBLICATIONS

Vehicular Technology Conference (VTC Fall), 2013 IEEE 78th, Las Vegas, NV, 2013, pp. 1-5.

* cited by examiner

MULTI-LAYER WIRELESS STREAMING WITH ADAPTIVE CONSTELLATION MAPPING (ACM)

CROSS-REFERENCE TO RELATED APPLICATIONS

This application claims the benefit of U.S. provisional application Ser. No. 62/140,410, filed Mar. 30, 2015, and U.S. provisional application Ser. No. 62/182,335, filed Jun. 19, 2015, which are hereby incorporated by reference.

BACKGROUND

The present invention relates to multiple-input multiple-output communications and more particularly to techniques for adaptive constellation mapping.

In a wireless communications networks, devices desire to communicate with other devices via communications channels, at the highest possible rates, with the least possible transmitted power and at the lowest possible cost. The desire for higher communication rates continues to grow. Multiple-input multiple-output techniques have provided some increases in communication rates. However, the need for further improvements remains.

SUMMARY

In an aspect, a method is provided for transmitting a plurality of layers from a transmitting device having a plurality of transmitter chains to a receiving device having a plurality of receiver antennas. The method includes: determining, for each transmitter chain of the plurality of transmitter chains, a set of mapped constellations by applying each mapping option of a set of mapping options associated with the respective transmitter chain to a signal constellation associated with the respective transmitter chain; determining, for each receiver antenna of the plurality of receiver antennas, for each transmitter chain of the plurality of transmitter chains, and for each mapping option of the set of mapping options associated with the respective transmitter chain, estimated received constellations using the set of mapped constellations associated with the respective transmitter chain and an estimated channel transfer function between the respective transmitter chain and the respective receiver antenna; determining a set of mapping combinations, each mapping combination including one mapping option of the set of mapping options associated with each transmitter chain of the plurality of transmitter chains; determining, for each receiver antenna of the plurality of receiver antennas, a set of combined estimated received constellations, each combined estimated received constellation being a combination of the estimated received constellations associated with one of the mapping combinations; determining, for each receiver antenna of the plurality of receiver antennas, a distance metric for each combined estimated received constellation associated with the respective receiver antenna; determining a set of blended metrics, each blended metric associated with one of the mapping combinations, each blended metric based on the distance metric for each receiver antenna of the plurality of receiver antennas associated with the respective mapping combination; determining a transmission format using the set of blended metrics; and transmitting from the plurality of transmitter chains using the determined transmission format.

In another aspect, a method is provided for transmitting a plurality of layers from a plurality of transmitters having a plurality of transmitter chains having a plurality of transmitter antennas to a receiving device having a plurality of receiver antennas. The method includes: determining a set of candidate transmission arrangements, each candidate transmission arrangement specifying a combination of layers, transmitters, transmitter chains, and transmitter antennas; for each candidate transmission arrangement: determining a set of mapping combinations, each mapping combination applicable to the respective candidate transmission arrangement, determining, for each receiver antenna of the plurality of receiver antennas, a combined estimated received constellation associated each mapping combination, determining, for each receiver antenna of the plurality of receiver antennas, a distance metric for each combined estimated received constellation associated with the respective receiver antenna, determining, for each mapping combination, a blended metric based on the distance metric for each receiver antenna of the plurality of receiver antennas associated with the respective mapping combination, and selecting a best one of the blended metrics; selecting one of the candidate transmission arrangements based on the selected blended metrics associated with each candidate transmission arrangement; and transmitting using the combination of layers, transmitters, transmitter chains, and transmitter antennas associated with the selected candidate transmission arrangement and the mapping combination associated with the selected blended metric associated with the selected candidate transmission arrangement.

In another aspect, a transmitter is provided for communicating with a receiving device having a plurality of receiver antennas. The transmitter includes: a plurality of transmitter chains for transmitting a plurality of layers; a plurality of antenna coupled to the transmitter chains; and a processor configured to determine, for each transmitter chain of the plurality of transmitter chains, a set of mapped constellations by applying each mapping option of a set of mapping options associated with the respective transmitter chain to a signal constellation associated with the respective transmitter chain; determine, for each receiver antenna of the plurality of receiver antennas, for each transmitter chain of the plurality of transmitter chains, and for each mapping option of the set of mapping options associated with the respective transmitter chain, estimated received constellations using the set of mapped constellations associated with the respective transmitter chain and an estimated channel transfer function between the respective transmitter chain and the respective receiver antenna; determine a set of mapping combinations, each mapping combination including one mapping option of the set of mapping options associated with each transmitter chain of the plurality of transmitter chains; determine, for each receiver antenna of the plurality of receiver antennas, a set of combined estimated received constellations, each combined estimated received constellation being a combination of the estimated received constellations associated with one of the mapping combinations; determine, for each receiver antenna of the plurality of receiver antennas, a distance metric for each combined estimated received constellation associated with the respective receiver antenna; determine a set of blended metrics, each blended metric associated with one of the mapping combinations, each blended metric based on the distance metric for each receiver antenna of the plurality of receiver antennas associated with the respective mapping combination; and determine a transmission format using the set of blended metrics, wherein the transmitter chains transmit using the determined transmission format.

Other features and advantages of the present invention should be apparent from the following description which illustrates, by way of example, aspects of the invention.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
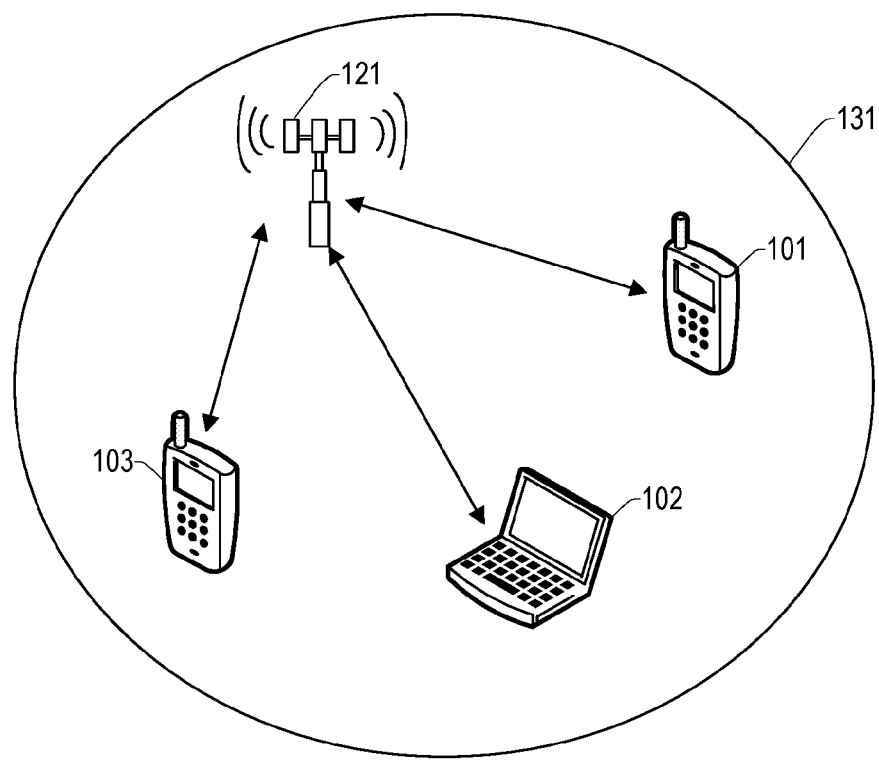
FIG. 1 illustrates a single cell communication scenario.

The detailed description set forth below, in connection with the accompanying drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in simplified form in order to avoid obscuring such concepts.

The term "access node" generally refers to wireless communications equipment that communicates with terminals within its wireless range. The access node can be a base station, a macro station, a macro base station, a femto base station, a femto station, a pico base station, a pico station, a micro base station, a micro station, an access point in a Wireless Local Area Network (WLAN) system, a node of a microwave wireless radio link, transmission and reception points such as remote radio heads, or a transceiver within an evolved node-B (eNB or eNodeB) that operates according to a cellular communications standard such as long term evolution (LTE) standard of $3^{rd}$ generation partnership program (3GPP).

The term "cell," such as used in femtocell, microcell, picocell, and macrocell, generally denotes the coverage footprint of a corresponding access node, or the coverage footprint of a sector of a multi-sector base station.

The term "terminal" generally refers to a fixed or mobile communications device. The terminal may be located inside user equipment such as a cellular phone, a smart phone, a tablet PC, laptop, or any other communications device that communicates with an access node. The terminal may for example be a client in a WLAN system, a node of a microwave wireless radio link, or, user equipment (UE) that functions according to a cellular communications standard such as the LTE standard.

The term "network" generally denotes a collection of one or more access nodes and one or more terminals. A network may consist of only macro stations as access nodes. A network may also be a heterogeneous network. In heterogeneous networks, smaller cells such as picocells, microcells or femtocells may be partially or wholly located within the coverage area of each other or one or more macro stations. Heterogeneous networks may also be referred to as HetNets. The term small cell generally refers to a microcell, a picocell, or a femtocell.

A terminal may operate in a mode where it is associated with an access node within its wireless range. In this associated mode, the terminal may receive data and control signals from the access node it associates with. As propagation conditions change or a terminal moves within a cell, association with another cell may become more favorable. The access node and the terminal may then be involved with a handover procedure that associates the terminal with another access node. Typically it may be favorable to perform a handover of terminals that move towards the geographical edges of cells and continue into the coverage area of another cell. Terminals that are geographically located near the edges of cells are typically called cell-edge terminals. A terminal may also operate in a mode where it continuously may be communicating with more than one access node where the communications between each of the access nodes and the terminal may involve either or both of data and control signals.

The systems and methods described herein can provide improved link and network performance. The systems and methods described herein can also enable lower-cost system equipment.

An exemplary system which may be used to describe methods disclosed herein is provided in FIG. 1 below. FIG. 1 is a drawing of transmissions between terminals 101, 102, 103 and an access node 121 with coverage area—cell 131. The terminals communicate with the access node. Techniques described herein can apply to any communication system although the exemplary system provided in FIG. 1 uses cellular communications systems terminology. Each link depicted between the terminals and the access node in FIG. 1 may be bidirectional. Depending on the direction of transmission the access node and the terminals may take on transmitter and receiver roles. In the uplink direction, the terminals transmit signals to the access node by using transmitters located in the terminals, and the access node receives the transmissions from the terminals by using a receiver located inside the access node. In the downlink (DL) direction, the access node transmits signals to the terminals by using a transmitter located in the access node, and the terminals receive the transmissions from the access node by using receivers located inside the terminals.

Resource Allocation Problem and OFDM

Orthogonal frequency division multiplex (OFDM) modulated signals are used by numerous communication systems standards. Systems that use OFDM modulated signals for communications may be referred to as OFDM systems for brevity. In OFDM systems, a data stream to be transmitted in a transmitter is divided into numerous sub-streams. A data stream is a sequence of data elements for transmission of audio, video, and other digital data traffic. Each data element of a sub-stream is transmitted by using a narrowband modulated waveform. In OFDM systems, the narrowband modulated waveform used for transmitting a sub-stream may also be referred to as a subcarrier. The narrowband modulated waveforms are multiplexed in the frequency domain in an orthogonal manner.

An OFDM symbol is a waveform formed by simultaneous transmission of all narrowband modulated waveforms within the system transmission bandwidth. A subcarrier of an OFDM symbol may also be referred to as a resource element. The narrowband modulated waveforms may be modulated according to modulations such as BPSK, QPSK, 16-QAM, 64-QAM, etc. Each modulation is associated with a constellation. A constellation is a set of constellation points. Each constellation point is a complex number specified as an in-phase/quadrature (or "I-Q") pair or a complex number with real part defined by the I value and the complex part defined by the Q value. The narrowband modulated waveforms may be modulated directly with constellation points associated with the values of the data elements. Alternatively, the narrowband modulated waveforms may be modulated with a transformed signal derived from constellation points associated with the values of the data elements. A transformation that may be used is a Fourier transform type transformation as used in single carrier frequency division multiple access (SC-FDMA) systems such as the uplink (UL) of a cellular LTE system. Such a transformation is often referred to as a DFT precoded OFDM technique.

Orthogonal frequency division multiple access (OFDMA) is a multiple access technique that is based on OFDM. OFDMA is used for orchestrating access of multiple users to the wireless medium for transmission and reception. Systems where multiple-access is established through OFDMA may be referred to as OFDMA systems for brevity. In OFDMA systems, resource allocation is accomplished by allocating one or more subcarriers of one or more OFDM symbols to different users. Since OFDM symbols that are transmitted at different times represent time domain allocation resources and subcarriers at different frequencies represent frequency domain allocation resources, the OFDMA resource allocation can also be called a time/frequency (T/F) resource allocation.

Two common scenarios in which OFDMA resource allocation is used include (1) the use of multiple transmitters transmitting to a single receiver, and (2) the use of a single transmitter transmitting to multiple receivers. An uplink transmission where multiple terminals transmit to a single access node is an example of scenario (1). A downlink transmission where a single access node is transmitting to multiple terminals is an example of scenario (2).

In scenario (1), individual transmitters transmit using T/F resources allocated for their transmission. The receiver receives a signal that is formed by a superposition of individual transmissions from the transmitters each transformed by the wireless channel. Knowing the T/F resources allocated to each of the transmitters, the receiver can separate received data from each of the transmitters.

In scenario (2), unique T/F resources are allocated to the transmissions to different receivers. Each receiver knows its unique T/F resource allocation and can extract the data targeted for it.

In OFDMA transmission by multiple transmitters to a single receiver (e.g., uplink transmission in cellular systems) it may be desirable to make sure that communications from individual transmitters do not negatively impact reception of signals from other transmitters. Techniques by which this may be accomplished include the following: (a) allocating resources such that no two transmitters transmit in a coinciding T/F resource (i.e., all transmitters using distinct T/F resources); (b) enable and orchestrate transmission of multiple transmitters using coinciding set of resources (i.e., at least two OFDM transmissions at the same time and actively using the same subcarriers) and using special signal processing to extract transmissions from multiple transmitters at the receiver.

Technique (a) limits the total throughput that can be obtained for a given T/F resource. In technique (b), at least some coinciding T/F resources are used by multiple transmitters. Reusing the T/F resources can increase the data rates and the number of transmitters supported by T/F resources. As a result reusing the T/F resources is beneficial to increasing the network capacity.

In OFDMA transmission by a single transmitter to multiple receivers (e.g., downlink transmission in cellular systems) it is may be desirable to make sure that communications to individual receivers are not negatively impacted by transmission to other receivers. Techniques by which this may be accomplished include the following: (1) allocating resources such that transmission to receivers are allocated to distinct T/F resources; (2) enable and orchestrate transmissions to multiple receivers using a coinciding set of resources and use special signal processing to extract transmissions to each receiver. Technique (1) limits the total throughput that can be obtained a given T/F resource. In technique (2), at least some coinciding T/F resources are used by multiple receivers. Reusing the T/F resources can increase the data rates and the number of receivers supported by T/F resources. As a result, reusing the T/F resources is beneficial to increasing the network capacity.

MIMO Techniques

Multiple transmissions of independent data streams by using coinciding T/F resource allocation has been enabled by developments in communication systems engineering. These techniques are a subset of a family of techniques that are called multiple-input multiple-output (MIMO) techniques. In MIMO systems, more than one antenna at either or both of the receiver and transmitter are used. In a class of MIMO techniques called spatial multiplexing, multiple transmissions are resolved from each other using multiple antennas and associated receiver circuitry at the receiver. In MIMO spatial multiplexing (MIMO-SM), the transmission data rate is increased by making multiple transmissions at coinciding T/F resources while using multiple transmission and reception antennas. Distinct groups of data to be transmitted at coinciding T/F resources are conceptually coined as layers. For successful MIMO reception it is necessary that the channel conditions can support transmission and reception of multiple layers.

Other MIMO techniques include transmitter diversity and receiver diversity. In transmitter diversity, the same information is either directly, or in some coded form, transmitted over multiple antennas. In receiver diversity, multiple receiver antennas are used to increase the received signal quality. Any two or all of the techniques of transmitter diversity, receiver diversity, and spatial multiplexing may be used simultaneously in a system. For example, a MIMO-SM system may also deploy transmitter diversity in addition to receive diversity.

MIMO-SM techniques include single-user (SU) MIMO-SM and multi user (MU) MIMO-SM techniques.

In SU-MIMO-SM, multiple layers are transmitted by a transmitter at coinciding T/F resources and received by a receiver. A precoding operation in a MIMO transmitter may be used to transmit weighted combinations of signals associated with one or more of the transmitted layers by each antenna. Alternatively, the precoding operation may be designed such that each of the transmitter antennas is used for transmitting a unique layer, for example, in the LTE standard for uplink.

In SU-MIMO-SM, it is possible to transmit a given number of layers, S, using common T/F resource with Nt number of transmit antennas where S≤Nt. If a transmitter has more than S transmit antennas, the available set of antennas may be used in support of one or more of a transmit diversity mode, a precoding mode, and a beam forming mode. The available set of receiver antennas may be used for the purpose of resolving received layers, or in a receive diversity mode or beam forming mode.

In MU-MIMO-SM, multiple signals using common T/F resources are either transmitted by multiple transmitters and received by a receiver (e.g., uplink transmission in a cellular network) or transmitted by a single transmitter and received by multiple receivers (e.g., downlink transmission in a cellular network).

In a MU-MIMO-SM deployment where multiple signals with coinciding T/F resources are transmitted by multiple transmitters and received by a receiver, it is possible to have one or more of the transmitters each transmitting more than one layer with coinciding T/F resources shared by other transmitters. In MU-MIMO-SM deployment where multiple signals with coinciding T/F resources are transmitted by a single transmitter and received by multiple receivers it is possible to have more than one layer received by each of one or more of the receivers.

In MU-MIMO-SM for transmission from multiple transmitters to a single receiver, the minimum number of antennas required at each transmitter is the number of layers transmitted by the transmitter. If the number of antennas in a transmitter is more than the number of layers it is transmitting, the available set of antennas may be used in one or more of transmit diversity mode, precoding mode, and beam forming mode to enhance reliability of transmission. The receiver antennas may be used for resolving the transmitted layers and the receiver may operate in a receive diversity mode and/or beam forming mode to enhance reliability of reception.

In MU-MIMO-SM deployment where multiple signals with coinciding T/F resources are transmitted by a single transmitter and received by multiple receivers, it is possible to use a number of transmit antennas at least as large as the total number of layers transmitted by the transmitter. If the transmitter has a greater number of antennas than the total number of layers being transmitted, the available set of antennas may be used in one or more of transmit diversity mode, precoding mode, and beam forming mode to enhance reliability of transmission. The receiver antennas in multiple receivers may be used for resolving the layers that the receiver receives as well as either or both of receive diversity mode and/or beam forming mode to enhance reliability of reception.

In reference to FIG. 1, in downlink transmission the access node 121 may transmit a single layer on dedicated T/F resources to each of one or more of the terminals 101, 102, 103. Such transmission is called single-input single-output (SISO) transmission. Alternatively, the access node 121 may transmit multiple layers to each of one or more of the terminals 101, 102, 103 using dedicated T/F resources in a SU-MIMO-SM fashion. Alternatively, the access node 121 may transmit multiple layers to one or more of the terminals 101, 102, 103 using overlapping T/F resources in an MU-MIMO-SM fashion. The access node transmitter may transmit simultaneously in one or more of SISO, SU-MIMO-SM and MU-MIMO-SM modes.

In reference to FIG. 1 above, in uplink transmission each of one or more of the terminals 101, 102, 103 may transmit a single layer on a dedicated T/F resource in a SISO transmission fashion. Alternatively, each of one or more of the terminals 101, 102, 103 may transmit multiple layers to the access node 121 using dedicated T/F resources in a SU-MIMO-SM fashion. Alternatively, one or more terminals 101, 102, 103 may transmit one or more layers to the access node 121 using overlapping T/F resources an MU-MIMO-SM fashion. The terminals 101, 102, 103 may transmit simultaneously in one or more of SISO, SU-MIMO-SM and MU-MIMO-SM modes.

Multi Cell Communications Scenario

Figure 2:
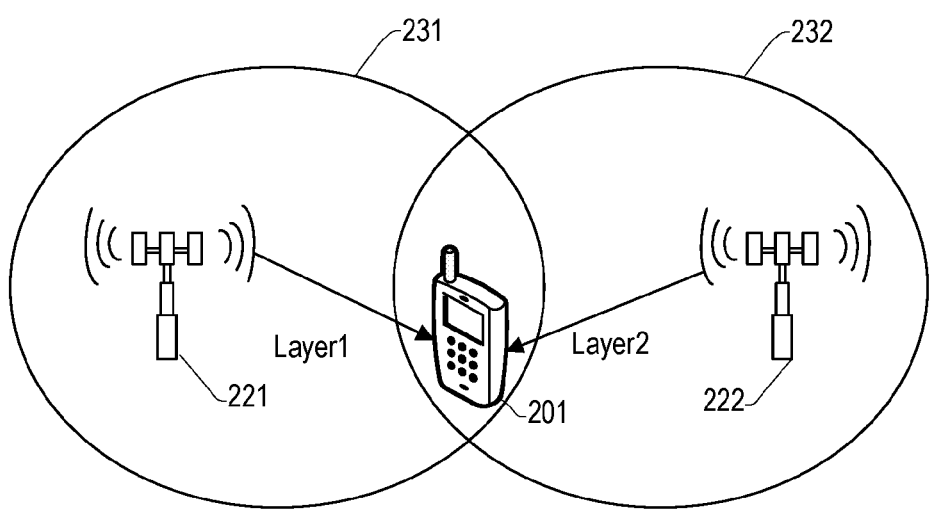
FIG. 2 illustrates a two cell downlink simultaneous multi-access node transmission scenario.

A cellular communications example in which two adjacent cells communicating with a terminal is shown in FIG. 2 below. In FIG. 2, a downlink simultaneous multi-access node transmission is depicted. In FIG. 2 access node 221 in cell 231 and access node 222 in cell 232 simultaneously transmit to terminal 201 where the receptions have overlapping resource allocations (i.e., using at least one common T/F resource element).

Multi Cell Interference Scenarios

Figure 3:
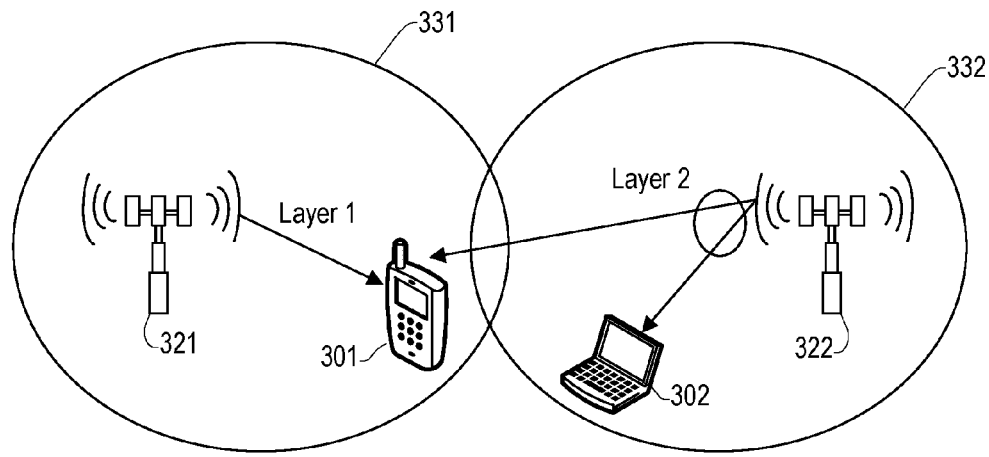
FIG. 3 illustrates a two cell downlink communication interference scenario.

In communications systems, transmitter and receiver pairs may be in the geographical proximity of other transmitter receiver pairs that may be in operation. A cellular communications example where two adjacent cells each having an access node communicating with a terminal within a cell is shown in FIG. 3 below. In FIG. 3 a downlink scenario is presented. In FIG. 3, access node 321 is transmitting layer 1 to terminal 301 in cell 331 and access node 322 is transmitting layer 2 to terminal 302 in cell 332 where transmission by access node 322 also impacts terminal 301 and causes downlink interference.

Figure 4:
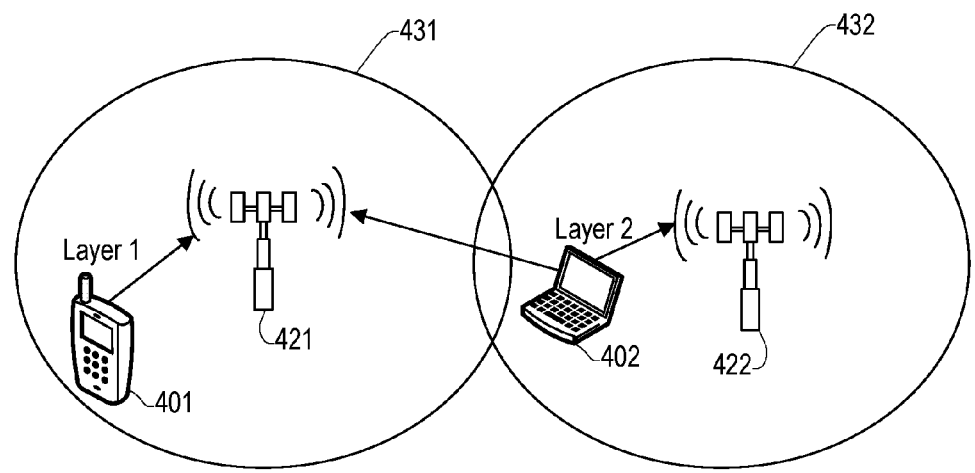
FIG. 4 illustrates a two cell uplink communications interference scenario.

A second cellular communications example of two adjacent cells, each having an access node communicating with a terminal within a cell, is shown in FIG. 4 below. In FIG. 4 an uplink interference scenario is presented. In FIG. 4, access node 421 is shown to receive transmission of layer 1 from terminal 401 in cell 431 and access node 422 is shown to receive transmission of layer 2 from terminal 402 in cell 432. Transmissions by terminal 402 to access node 422 also impact access node 421 and causes uplink interference to access node 421.

Channel Impacts on OFDM Transmission

In OFDM the transmitted OFDM waveforms get impacted by numerous conditions including transmitter radio frequency (RF) chain and antenna distortions, wireless channel attenuation, delay and multipath fading artifacts, and receiver antenna and receiver circuitry distortions.

For OFDM systems using a cyclic prefix, when the transmission period of the cyclic prefix of a narrowband modulated waveform is longer than the expected duration of the multipath channel delay, each individual sub-stream can in principle be decoded independently of other sub-streams. Furthermore, each individual sub-stream can also in principle be decoded independent of previous data transmissions. As a result, the impact of a channel to a transmitted waveform is typically characterized as amplitude scaling and phase shift for each of the subcarriers of the transmitted OFDM symbols. The amplitude scaling and phase shift value impact of a channel to a subcarrier is referred to as the channel transfer function (CTF) for the subcarrier. The CTF value for a subcarrier is a complex number whose magnitude and phase determines the channel amplitude scaling and phase shift, respectively.

The impact of the channel on a transmitted signal may be uniform across the transmitted frequency band. Alternatively, the impact of the channel on a transmitted signal may vary across the transmitted frequency band. A channel whose impact across a frequency band does not vary is called a frequency flat channel. A channel whose impact across a frequency band varies is called a frequency selective channel. In a frequency flat channel, all the CTF values for all subcarriers of OFDM symbols transmitted in the resource allocation frequency band are the same. In a frequency selective channel, the CTF values for subcarriers of OFDM symbols transmitted in the resource allocation frequency band are not the same.

CTF values may also vary over time (e.g., from one OFDM symbol to another) at the same frequency subcarrier. Such a channel is known as a time varying channel.

The received OFDM symbols may be impacted by numerous electrical noise sources including ambient noise and receiver noises.

Figure 5:
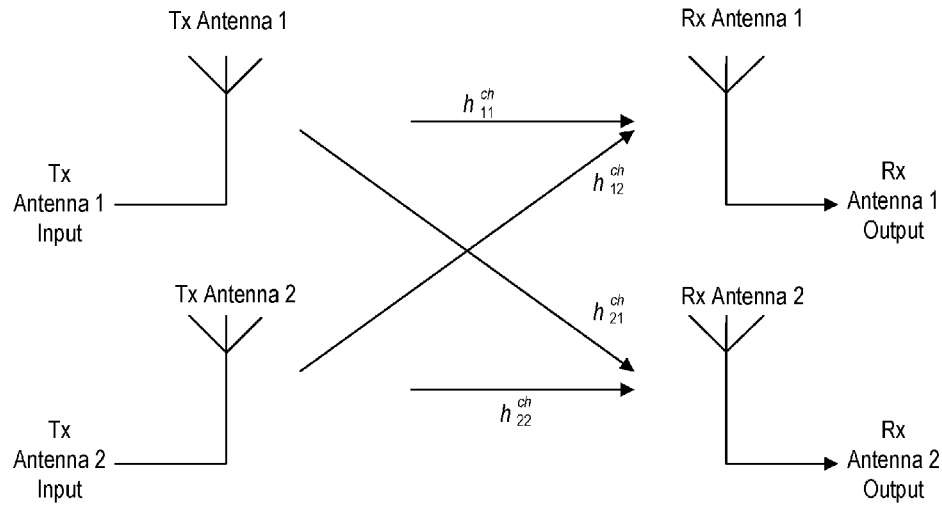
FIG. 5 illustrates channel impact on transmitted resource elements.

In FIG. 5, an example is provided of channel impact for the case of two transmitter antennas and two receiver antennas. As there are multiple transmissions that use coinciding T/F resources, each of the receiver antennas are exposed to versions of all signals from all transmitter antennas each impacted by the CTF between particular transmitter and receiver antennas. The represented CTF values $h_{11}^{ch}$, $h_{12}^{ch}$, $h_{21}^{ch}$, $h_{22}^{ch}$ that are depicted in FIG. 5 refer to complex valued CTF values between the specific antennas per each resource element of the transmission. In practice, each of the transmitter circuitry and the receiver circuitry are not perfect and may impact the received value for each transmitted resource element. CTF values $h_{11}^{ch}$, $h_{12}^{ch}$, $h_{21}^{ch}$, $h_{22}^{ch}$ may also be considered to incorporate the impact of transmitter and receiver distortions, as is often the case with practical systems.

The scenario depicted in FIG. 5 is applicable to the single cell and two cell uplink and downlink communications discussed earlier in this document.

In the uplink single cell case, antennas Tx Antenna 1 and Tx Antenna 2 may be co-located within a terminal and may be transmitting two layers of a SU-MIMO-SM transmission to the two receiver antennas Rx Antenna 1 and Rx Antenna 2 of an access node. Alternatively, the two antennas Tx Antenna 1 and Tx Antenna 2 may be placed in two distinct terminals with each transmitting one layer of a two layer MU-MIMO-SM transmission to the two receiver antennas Rx Antenna 1 and Rx Antenna 2 of an access node.

In the downlink single cell case, the antennas Tx Antenna 1 and Tx Antenna 2 of an access node may be transmitting two layers of a SU-MIMO-SM transmission to the two receiver antennas Rx Antenna 1 and Rx Antenna 2 of a terminal. Alternatively, the two antennas Tx Antenna 1 and Tx Antenna 2 of an access node may be transmitting two layers of a MU-MIMO-SM transmission to antenna Rx Antenna 1 of a terminal and antenna Rx Antenna 2 of a second terminal.

In the two cell downlink simultaneous multi-access node transmission case, the antennas Tx Antenna 1 and Tx Antenna 2 of FIG. 5 may represent transmit antennas located at access node 221 and access node 222 of FIG. 2, respectively, and the two antennas Rx Antenna 1 and Rx Antenna 2 of FIG. 5 may represent receiver antennas located at terminal 201 of FIG. 2. Terminal 301 of FIG. 3 may have only one receiver antenna in which case only the CTF values $h_{11}^{ch}$, $h_{12}^{ch}$, of FIG. 5 exist.

In the two cell downlink interference case, the antennas Tx Antenna 1 and Tx Antenna 2 of FIG. 5 may represent transmit antennas located at access node 321 and access node 322 of FIG. 3, respectively, and the two antennas Rx Antenna 1 and Rx Antenna 2 of FIG. 5 may represent receiver antennas located at terminal 301 and terminal 302 of FIG. 3, respectively.

In the two cell uplink interference case, the antennas Tx Antenna 1 and Tx Antenna 2 of FIG. 5 may represent transmit antennas located at terminal 401 and terminal 402 of FIG. 4, respectively, and the two antennas Rx Antenna 1 and Rx Antenna 2 of FIG. 5 may represent receiver antennas located at access node 421 and access node 422 of FIG. 4, respectively.

Channel Estimation in MIMO OFDM Transmission

The estimation and use of channel characteristics to aid decoding at a receiver can significantly increase reception performance in wireless communications. Channel characteristics that may be used by a receiver may include channel transfer function (CTF) estimates, receive signal level indications (RSSI), estimates of noise level impacting the receiver, signal to noise ratio (SNR) estimates, interference level estimates, and signal to interference and noise ratio (SINR) estimates.

Furthermore, knowledge of channel characteristics prior to transmission and adapting the transmitted signals based on the channel characteristics may lead to further improved reception performance.

In order to facilitate estimation of channel characteristics at the receiver, specific T/F resources may be allocated to signals that form a reference for the estimation of channel characteristics. The T/F resource locations and values of such reference signals may be known by both transmitters and receivers. Receivers use reference signals to identify the channel characteristics that impacted the transmitted signal. Some of the transmitted T/F resources may be used for transmission of the layer to be transmitted (layer data subcarriers). Furthermore some of the transmitted T/F resources (control and operational data subcarriers) may be used for transmission of control signals and operational information.

The subcarriers allocated to reference signals, layer data subcarriers, and control and operational data subcarriers may change from one OFDM symbol to another. In wireless communications, multiple OFDM symbols may be treated as a unit (e.g., a slot or a subframe in the LTE standard). Reference signals and their T/F location, layer data subcarriers, and control and operational data subcarriers may be defined per group of OFDM symbols (e.g., a slot or a subframe in the LTE standard).

The locations and values of reference signals are standards dependent. Different wireless systems refer to the reference signals by different names, for example, reference signal, pilot signal, cell specific reference signal (CRS), demodulation reference signal (DM-RS), channel state information reference signal (CSI-RS), and sounding reference signal (SRS).

A receiver may also use such layer data subcarriers and control and operational data subcarriers for channel characteristics estimation. The signals used for estimation of channel characteristics are named as channel measurement signals. Channel measurement signals may be reference signals, layer data subcarriers, and control and operational data subcarriers.

A transmitted OFDM symbol may have subcarriers allocated to transmission of reference signals, layer data subcarriers, and control and operational data subcarriers. Alternatively, an OFDM symbol may be allocated transmission of a subset of such signals or transmission of only one of these signals. For example, in uplink LTE systems, the OFDM symbols allocated to transmission of SRS does not carry any layer data subcarriers.

A common family of techniques for CTF estimation uses cross correlation operations between received reference signals and reference signals known to have been transmitted. A performance loss may be observed in a receiver if the receiver assumes a flat frequency channel model when the actual channel characteristics are frequency selective. For improved performance of the receiver in a frequency selective channel, it may be useful to employ a partitioning of received signal frequency range into partial frequency ranges where the channel characteristics do not change significantly and thus may be considered frequency flat. Separate CTF values for each of the partial frequency ranges are then obtained. Estimation of the CTFs in each of the partial frequency ranges may require use of partial reference signals in the individual partial frequency ranges.

Exemplary System

Figure 6:
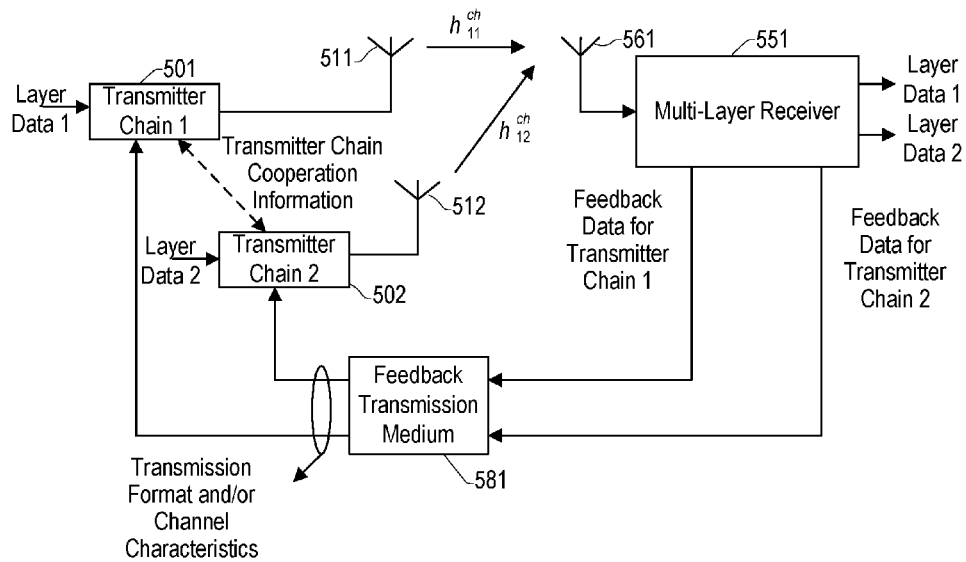
FIG. 6 is a block diagram of a communication system.

FIG. 6 is a block diagram of a communication system. The communication systems includes a first transmitter chain 501 (also referred to as transmitter chain 1) that transmits using a first transmit antenna 511 and a second transmitter chain 502 (also referred to as transmitter chain 2) that transmits using a second transmit antenna 512. A multi-layer receiver 551 receives the transmitted signals using a receiver antenna 561. A feedback transmission medium 581 provides for feedback from the multi-layer receiver 551 to the first transmitter chain 501 and the second transmitter chain 502.

Existing MIMO-SM precoding techniques include modifying the phase and amplitude of transmitted signals (e.g., via phase rotations and amplitude scaling) based on singular value decomposition (SVD) of the CTF matrix, thereby creating a diagonal, equivalent CTF matrix. MIMO-SM techniques are typically designed to operate based on the assumption that the number of transmitted layers is less than or equal to the number of transmit antennas and less than or equal to the number of receive antennas. That is, $S \leq \min(N_t, N_r)$.

Techniques provided herein select mapping options for transmit constellations by optimizing distance metrics. An example of a distance metric is the minimum Euclidean distance of the combined estimated received constellation (also referred to as a projected constellation) points at a multi-layer receiver. This reception metric may be optimized by determining the mapping option which maximizes this metric. Furthermore, techniques are provided to select the mapping option from among a predetermined set of mapping options. By using these methods, two advantages may be realized: (a) the number of transmitted layers may be larger than the number of receive antennas; and (b) the method may be applied without loss of performance to systems employing modulations having a large number of constellation points (e.g., 16-QAM) or to systems using a large number of transmitted layers.

Furthermore, reception techniques that are suitable for reception when the number of transmitted layers may be larger than the number of receive antennas are provided.

Although the system block diagram shown in FIG. 6 uses two transmitter chains, the techniques described in this document apply to more than two transmitter chains. Similarly, although the system block diagram shown in FIG. 6 uses only one receiver antenna, the techniques described herein apply to two or more receiver antennas as well.

Aspects of techniques provided herein apply to UL MU-MIMO-SM scenario, UL SU-MIMO-SM scenario, DL MU-MIMO-SM scenario, DL SU-MIMO-SM scenario, downlink simultaneous multi-access node transmission scenario, downlink multi-cell interference mitigation scenario, and uplink multi-cell interference mitigation scenario.

Transmitter Chains

Transmitter chains transmit the layer data at their input. (The term layer data in reference to FIG. 6 may also incorporate transmissions of control and operational data and channel measurement signals. These terms are omitted for brevity). Transmissions by transmitter chains according the techniques described herein may be referred to as adaptive constellation mapping (ACM) transmissions.

A transmitter chain is a sequence of system blocks that may be connected to an antenna that couples electrical signals at its input to the wireless medium. The term "antenna" used in reference to a component connected to a transmitter chain may refer to a single physical antenna or a plurality of physical antennas that may be used to perform transmit diversity or transmit beamforming.

In an aspect, a transmitter chain may operate while being connected to a single physical antenna. The single physical antenna may be selected from a plurality of physical antennas that a transmitter chain may be connected to.

When a transmitter chain operates while being connected to multiple physical antennas in a transmit diversity mode, the signal from the transmitter chain may be transmitted from all of the physical antennas. When a transmitter chain operates while being connected to multiple physical antennas in a transmit beamforming mode, the signals to be transmitted may be weighed with complex numbers prior to being fed into the physical antennas to obtain directional transmit beamforming.

Layer data may be a preprocessed form of a single layer or multiple layers that is to be transmitted by the transmitter chain. Preprocessing steps may include operations such as forward error correction, interleaving, scrambling, precoding, etc.

Transmitter chains may be located in different physical locations. Alternatively, one or more transmitter chains may be co-located. All transmitter chains may be a part of a single transmitter.

A transmitter chain may transmit reference signals to aid channel characteristics estimation by the multi-layer receiver. During the transmission of an OFDM symbol or a group of OFDM symbols, a transmitter chain may transmit only reference signals, it may transmit reference signals simultaneously while transmitting layer data, or it may transmit only layer data.

Subcarriers used for transmission of layer data are digitally modulated according to modulations such as PSK and QAM. Alternatively, the subcarriers used for transmission of layer data are transformed according a transform function such as a form of Fourier transform after being digitally modulated according to modulations such as PSK and QAM as in the case in the uplink LTE system. The transmissions from each transmitter chain may be mapped by applying amplitude scaling and phase adjustment. Identifiers that may specify the modulation that may be used by the transmitter chain and mapping that may be used by the transmitter chain are collectively called the transmission format. Other parameters and configuration needed for transmission would be available at the transmitter as would be evident to one skilled in the art.

A transmitter chain may perform transmission format determination (TFD) to determine the transmission format for each of the transmitter chains.

Transmitter chains may communicate scheduling, resource allocation, transmission format, layer data, and any interim processed signals with each other and use such communicated information in forming their transmissions.

Channel

In FIG. 6, the channel characteristics from transmitter chain 1 to multi-layer receiver and from transmitter chain 2 to the multi-layer receiver are shown as $h_{11}^{ch}$, and $h_{12}^{ch}$ respectively. In an OFDM aspect, $h_{11}^{ch}$, and $h_{12}^{ch}$ refer to the CTF for each subcarrier. In a frequency selective channel, multiple frequency adjacent subcarriers may have the same CTF values. In a frequency non-selective channel, all subcarriers may have the same CTF values. In a single carrier aspect, $h_{11}^{ch}$, and $h_{12}^{ch}$ refer to the CTF values for entirety of the channel bandwidth.

Multi-Layer Receiver

The multi-layer receiver receives transmissions from transmitter chain 1 and transmitter chain 2 and employs a detection process to detect layer data transmitted by transmitter chains.

The multi-layer receiver may have one or multiple receiver chains. A receiver chain is a sequence of system blocks that may be connected to one or multiple physical antennas.

The term "antenna" used in reference to a component connected to a receiver chain may refer to a single physical antenna or a plurality of physical antennas that may be connected so as to perform receive diversity or receive beamforming.

In performing receive diversity, the physical antennas connected to a receiver chain may operate in a diversity selection mode or a in a diversity combining mode. In diversity selection mode one or more physical antennas that have favorable reception are chosen for connection to a receiver chain. If more than one physical antenna is chosen in a diversity selection mode, signals from selected physical antennas may be summed prior to being fed into the receiver chain. In a diversity combining mode, multiple physical antenna outputs may be summed prior to being fed into a receiver chain.

In performing receive beamforming, signals from multiple physical antennas may be weighed with complex numbers prior to summation to obtain directional receive beamforming. The physical antennas of the multi-layer receiver may be at the same physical location or they may be in different physical locations (e.g., radio remote heads or a distributed antenna system antennas). A portion of receiver chain circuitry may be co-located with remotely located physical antennas.

The multi-layer receiver may estimate channel characteristics between transmitter chains and multi-layer receiver. The multi-layer receiver may also store channel characteristics and use the stored channel characteristics for aiding subsequent channel characteristics estimations and receptions.

The multi-layer receiver may perform TFD to determine the transmission format for one or more of the transmitter chains.

Feedback Data

The multi-layer receiver transmits feedback data as a part of an ACM procedure. The feedback data may contain transmission formats if transmission formats for the transmitter chains are determined at the multi-layer receiver.

Feedback data may include channel characteristics information if the channel characteristics for the channels between the transmitter chains and the multi-layer receiver (MLR) are estimated at the MLR and the ACM aspect requires this information to be used outside the MLR. For example, when the TFD is performed outside the MLR, for instance the device containing the transmitter chain, and the TFD relies on channel characteristics estimated at the MLR, the channel characteristics information is included in the feedback data.

Feedback Transmission Medium

The feedback data transmitted by the multi-layer receiver is carried through the feedback transmission medium. The feedback transmission medium may be a wireless medium. For example, in a MU-MIMO-SM system in uplink cellular communications with transmitter chains located in terminals (e.g., LTE user-equipment or UE) at different geographic locations and the TFD is conducted at the MLR located inside an access node, the transmission format to be carried as feedback data can be transmitted to each terminal by the wireless downlink communications capability of the cellular system.

The feedback transmission medium may be a wired communications medium. For example, in an ACM aspect in a microwave point to point communications network, there may be a wired connection between the wireless nodes. The wireless nodes may for example use protocols such as Ethernet, internet protocol (IP) and other wired communications techniques to communicate with each other.

The feedback transmission medium may use a combination of both wireless and wired means. For example, let us consider an ACM aspect in a two cell downlink simultaneous multi-node transmission where two transmitter chains are located one in each of two access nodes and the multi-layer receiver may be located in a terminal. Let us also consider that TFD is implemented in the terminal. Then the transmission formats to be used by the transmitter chains must be provided to the two access nodes in the feedback data. This can be accomplished by the terminal transmitting the feedback data to one of the access nodes using the uplink. The receiving access node may then transmit through a wired connection such as backhaul connection all or some of (e.g., just the second access node's transmission format) the feedback data that the transmitter chain in the second access node must use.

The feedback transmission medium may use a combination of both wireless and wired means where the feedback transmission medium may use a wireless communications method different than that used for the transmission of layer data. For example, in an ACM aspect in downlink cellular communications where all transmitter chains and the TFD are located at the same access node, the channel characteristics information from the multi-layer receiver at the terminal may be carried as feedback data to the access node. The transmission of the channel characteristics to the access node may be performed, for example, using a combination of WLAN communications and wired communications such as a cable modem system.

ACM Configurations

In an example system that addresses the uplink MU-MIMO-SM scenario, one or more transmitter chains may be located in each terminal. A multi-layer receiver may be located in an access node.

In an example system that addresses the uplink SU-MIMO-SM scenario, a number of transmitter chains may be located in a terminal. A multi-layer receiver may be located in an access node.

In an example system that addresses the downlink MU-MIMO-SM scenario, a number of transmitter chains may be located in an access node. A multi-layer receiver may be located in each terminal.

In an example system that addresses the downlink SU-MIMO-SM scenario, a number of transmitter chains may be located in an access node. A multi-layer receiver may be located in a terminal.

In an example system that addresses the downlink simultaneous multi-access node transmission scenario, one or more transmitter chains may be located in each access node. A multi-layer receiver may be located in a terminal.

In an example system that addresses the downlink multi-cell interference mitigation scenario, one or more transmitter chains may be located in each of access nodes. A multi-layer receiver may be located in a terminal.

In an example system that addresses the uplink multi-cell interference mitigation scenario, one or more transmitter chains may be located in each terminal. A multi-layer receiver may be located in an access node.

Figure 7:
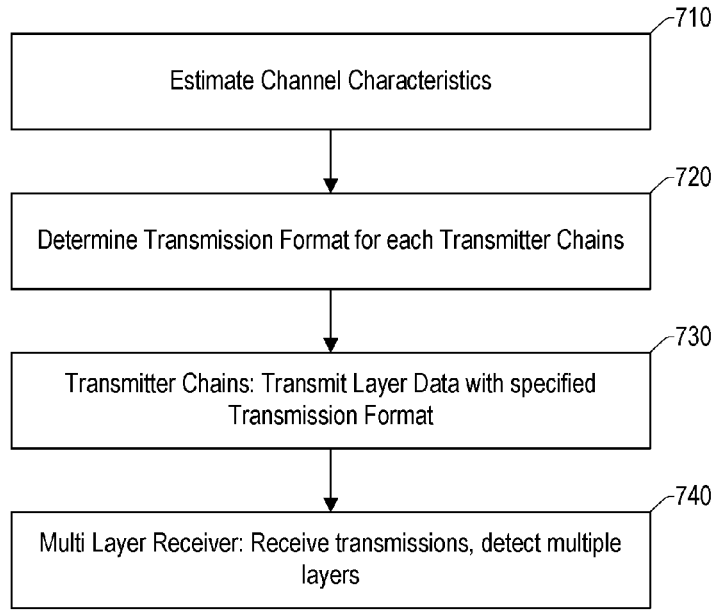
FIG. 7 is a flowchart of a process for adaptive constellation mapping communications.

System Operations:

FIG. 7 is a flowchart of a process for adaptive constellation mapping communications. To provide a specific example, the process will be described with reference to the communication system of FIG. 6; however, the process of FIG. 7 may be used with any suitable system. The adaptive constellation mapping communications process will also be described with FIG. 1, FIG. 2, FIG. 3, or FIG. 4 for the various communication scenarios.

In step 710, channel characteristics of transmissions of transmitter chain 1 and transmitter chain 2 as received by multi-layer receiver are estimated.

In an aspect, the multi-layer receiver may estimate channel characteristics by using channel measurement signals. To aid estimation of channel characteristics, transmitter chains may transmit reference signals for use as channel measurement signals in which case channel characteristics estimation may be made based on the reference signals. The scheduling and resource allocation of reference signals may be dictated by an algorithm co-located with the multi-layer receiver. Alternatively, the scheduling and resource allocation for reference signals transmitted by transmitter chains may be dictated by an algorithm co-located with one or more of the transmitter chains. Alternatively, the scheduling and resource allocation for reference signals transmitted by transmitter chains may be decided each transmitter chain and signaled to the multilayer receiver.

In an aspect, the multi-layer receiver may estimate channel characteristics by using channel measurement signals such as layer data subcarriers, and control and operational data subcarriers.

In another aspect, channel characteristics of transmissions of transmitter chain 1 and transmitter chain 2 terminating at multi-layer receiver may already be known, and thus there may not be a need for transmitter chains to transmit channel measurement signals. An example for such situation is in an uplink time division duplexed (TDD) System. In the TDD system, the transmissions from transmitter chains to multi-layer receiver and transmissions from multi-layer receiver to transmitter chains use the same frequency. Thus, due to channel reciprocity, estimates for the channel characteristics for transmissions starting at the multi-layer receiver and ending in transmitter chains may be good estimates of channel characteristics for channels starting at transmitter chains and ending at the multi-layer receiver. For example, in aspects where ACM transmissions are made in the uplink direction of a TDD system, the measurements of downlink channel characteristics may be used as uplink channel characteristics.

In another aspect, the multi-layer receiver may use stored estimates as estimated channel characteristics. This aspect may be the case where the channel characteristics are not expected to change significantly in time and use of channel characteristics estimated at an earlier time is considered sufficient.

In uplink MU-MIMO-SM, uplink SU-MIMO-SM, downlink MU-MIMO-SM, and downlink SU-MIMO-SM aspects of this invention, the measurement of channel characteristics may, for example, be conducted by using reference signals whose resource allocation and scheduling is performed by the access node.

In aspects that address the downlink simultaneous multi-access node transmission scenario, and, the downlink multi-cell interference mitigation scenario, the access nodes may cooperate for facilitating measurement of channel characteristics by a terminal that will receive ACM transmission (e.g., terminal 201 in FIG. 2 and terminal 301 in FIG. 3 respectively). For example, resource allocation and scheduling of reference signals may be jointly determined by the access nodes. One or more of the access nodes may communicate the resource allocation and scheduling information for reference signals from the access nodes to the terminal.

In an aspect that addresses the uplink multi-cell interference mitigation scenario, the access nodes may cooperate for facilitating measurement of channel characteristics by an access node that will receive ACM transmissions (e.g., access node 401 in FIG. 4.). For example, resource allocation and scheduling of reference signals may be jointly determined by the access nodes. Next, access node 421 may communicate the resource allocation and scheduling information for reference signals to terminal 401. Similarly, access node 422 may communicate the resource allocation and scheduling information for reference signals to terminal 402.

In step 720, the transmission format for each of the transmitter chains is determined by using the channel characteristics.

In an aspect, the multi-layer receiver may determine and transmit the transmission formats to be used by each of the transmitter chains and sends this information as the feedback data to the transmitter chains through the feedback transmission medium.

In another aspect, the transmission format may be determined at a specific transmitter chain. Alternatively, the transmission format may be determined by a function that may be co-located with one or more of transmitter chains. Alternatively, transmission formats may be determined at a location different than that of the transmitter chains and the multi-layer receiver.

In the case that the transmission formats are determined at a location outside the multi-layer receiver, channel characteristics to be used by the TFD may be transmitted by the multi-layer receiver as a part of the feedback data.

In the case that the transmission formats are determined at a location outside the multi-layer receiver, the transmission formats may be provided to the multi-layer receiver. The multi-layer receiver may use the transmission formats for assisting the detection process. The transmission formats may be provided to the multi-layer receiver for example as a part of scheduling and resource allocation signaling.

In aspects that address the downlink simultaneous multi-access node transmission and downlink multi-cell interference mitigation scenarios, the transmission formats may, for example, be determined at the terminal that will receive ACM transmission (e.g., terminal 201 in FIG. 2). Alternatively, the transmission formats may, for example, be determined at one of the access nodes. Communication of the transmission format may be performed using, for example, a communication link such as the X2 interface used to communicate between LTE eNBs.

In the downlink simultaneous multi-access node transmission, two access nodes transmit layer data 1 and layer data 2, to a terminal using overlapping T/F resources.

In an aspect that addresses the downlink interference mitigation scenario, access node 321 transmits layer data 1 to terminal 301 and access node 322 transmits layer data 2 to terminal 302. In an aspect, the transmission format of layer data 2 may be chosen to minimize impact of transmission of layer data 2 to reception of layer data 1 by terminal 301. Thus, transmission format for transmission by access node 322 is decided by taking into account the reception performance of layer 1 and layer 2 at terminal 301.

Alternatively, the transmission format of layer data 2 is not chosen to minimize impact of transmission of layer data 2 to reception of layer data 1 by terminal 301. The transmission format for transmission by access node 321 is decided by taking into account the reception performance at terminal 301. Transmission by access node 321 may be based on information such as modulation type and channel characteristics of the channel between access node 322 and terminal 301 which may be obtained through information exchange between access nodes.

In an aspect that addresses the uplink multi-cell interference mitigation scenario, terminal 401 transmits layer data 1 to access node 421 and terminal 402 transmits layer data 2 to access node 422. In an aspect, transmission format for layer data 2 may be chosen to minimize impact of transmission of layer data 2 to reception of layer data 1 by access node 421. Thus, the transmission format for transmission by terminal 402 is decided by taking into account the reception performance of layer 1 and layer 2 at access node 421.

Alternatively, the transmission format of layer data 2 is not chosen to minimize impact of transmission of layer data 2 to reception of layer data 1 by access node 421. The transmission format for transmission by terminal 401 is decided by taking into account the reception performance at access node 421. The transmission format for transmission by terminal 401 may be based on information such as modulation type and channel characteristics of the channel between terminal 402 and access node 401.

In step 730, the transmitter chains transmit layer data at their input using specified scheduling, resource allocation, and transmission format. Scheduling and resource allocation may for example be conducted in the medium access control (MAC) layer. Scheduling and resource allocation information may be provided to the transmitter chains as is customary in wireless systems.

In step 740, the multi-layer receiver receives the transmissions of step 730 and performs detection to recover layer data transmitted by transmitter chains.

It should be appreciated that the steps described above with respect to FIG. 7, may vary depending on the particular scenario being implemented, for example, based on the various scenarios described herein. In addition, steps described in FIG. 7 may be combined and/or implemented in other orders (including concurrently) than the order shown in FIG. 7.

Transmitter Chain Description

Figure 8:
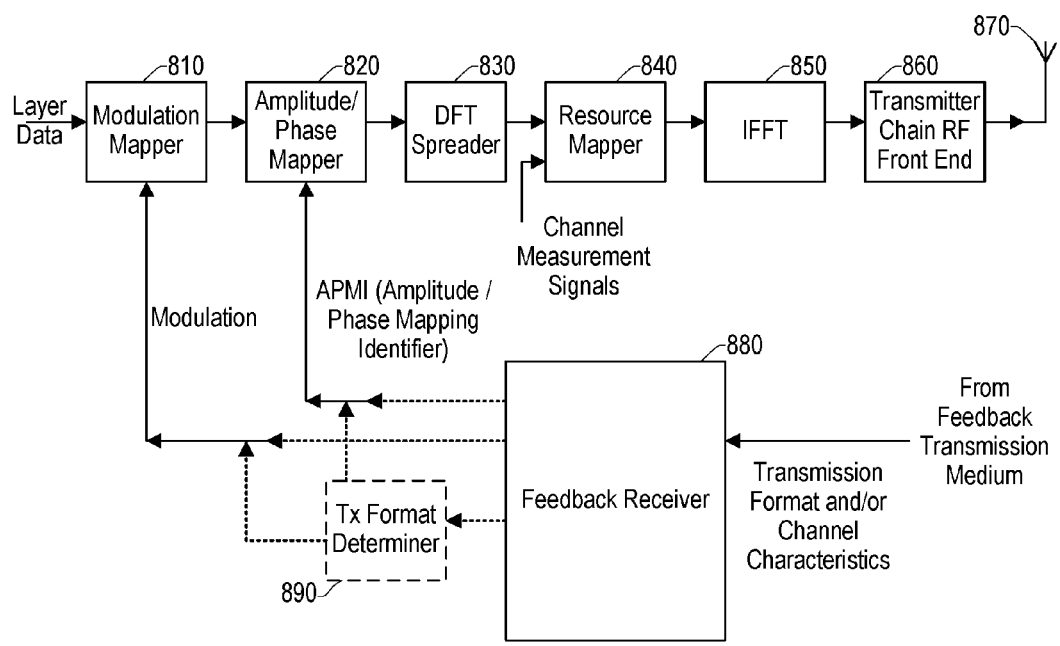
FIG. 8 is a block diagram of a transmitter chain.

In FIG. 8 below, a block diagram for an exemplary transmitter chain is shown. The first transmitter chain 501 and the second transmitter chain 502 of the communication system of FIG. 6 may, for example, be provided by the transmitter chain of FIG. 8.

The modulation mapper (MM) 810 maps layer data at its input to constellation points. The modulation to be used by the modulation mapper 810 is identified by the TFD 890 and may be provided to the modulation mapper 810. The layer data at the input of the modulation mapper 810 may be represented as binary bits. The output of the modulation mapper 810 may be represented as complex numbers representing constellation point I-Q values.

The amplitude/phase mapper (APM) 820 maps complex numbers at its input to complex numbers at its output by changing amplitude and/or adjusting phase. The amount of amplitude change and phase adjustment may be specified by a set of parameters provided to the amplitude/phase mapper 820. These parameters may identify the amount of amplitude change and phase adjustment to be used by the amplitude/phase mapper 820. Alternatively, these parameters may be an index to access a codebook entry which is then used to identify the amount of amplitude change and phase adjustment. The set of parameters may for example be called amplitude/phase mapping identifiers (APMI).

The amplitude/phase mapping identifiers may include parameters that specify the amplitude mapping. The parameter that specifies the amplitude mapping may for example be called amplitude mapper index (AMI). The amplitude mapper index may be a digital identifier indicating which amplitude scaling is to be done among a set of possible amplitude values.

The parameter that specifies the phase mapping may for example be called a phase mapper index (PMI). The phase mapper index may be a digital identifier indicating which phase adjustment is to be done among a set of possible set of phase adjustment values.

In an alternate aspect, the modulation mapper and the amplitude/phase mapper may be combined into a single block where layer data is mapped to a modified constellation where individual constellation points are amplitude scaled and phase adjusted in accordance with amplitude/phase mapping identifiers.

In FIG. 8, the TFD function is shown using dashed lines to convey that the use of TFD in a transmitter chain is possible but that various alternative architectures are also possible, as previously described. TFD will be described later in this document while describing multi-layer receiver operation in detail. If TFD function is not implemented at a transmitter chain, the transmitter chain may receive and use ACM APMI that is obtained outside the transmitter chain.

The discrete Fourier transform (DFT) spreader 830 is an optional block that may be used in aspects where the transmission format is single frequency-frequency division multiple access (SC-FDMA). In OFDM systems, the DFT spreader 830 is not used.

A resource mapper 840 maps its complex valued inputs to the T/F resource grid. As a result, reference signals, layer data subcarriers, and control and operational data subcarriers may be multiplexed into subcarriers of the OFDM symbols to be transmitted. The resource mapper 840 outputs a vector.

Next, the inverse fast Fourier transform (IFFT) function 850 uses an inverse fast Fourier transform operation to process the vector and to generate complex valued signals. Specifics of how IFFT is implemented may be defined in a standard such as the 3GPP LTE standard. The IFFT input is typically considered a frequency domain signal and the IFFT output is considered a time domain signal. The IFFT output is a sequence of complex values that are typically input sequentially to a transmitter chain radio frequency (RF) front end 860.

The transmitter chain RF front end 860 performs operations such as cyclic prefix addition, digital to analog conversion, up conversion, and amplification. Signals from the transmitter chain RF front end 860 are transmitted as radio signals using antenna 870.

The Feedback Receiver

A feedback receiver 880 receives information from the feedback transmission medium. The received feedback data may include the transmission format that a transmitter chain should use for ACM transmission. Alternatively, in an aspect where a transmitter chain includes a TFD, the received feedback data may be channel characteristics for the channels between the transmitter chains and the multi-layer receiver.

The feedback receiver 880 may be, for example, a wireless receiver of the same air interface technology as the ACM transmission, a wireless receiver of different air interface technology as the ACM transmission, or a wired communications receiver.

Multi-Layer Receiver Description

Figure 9:
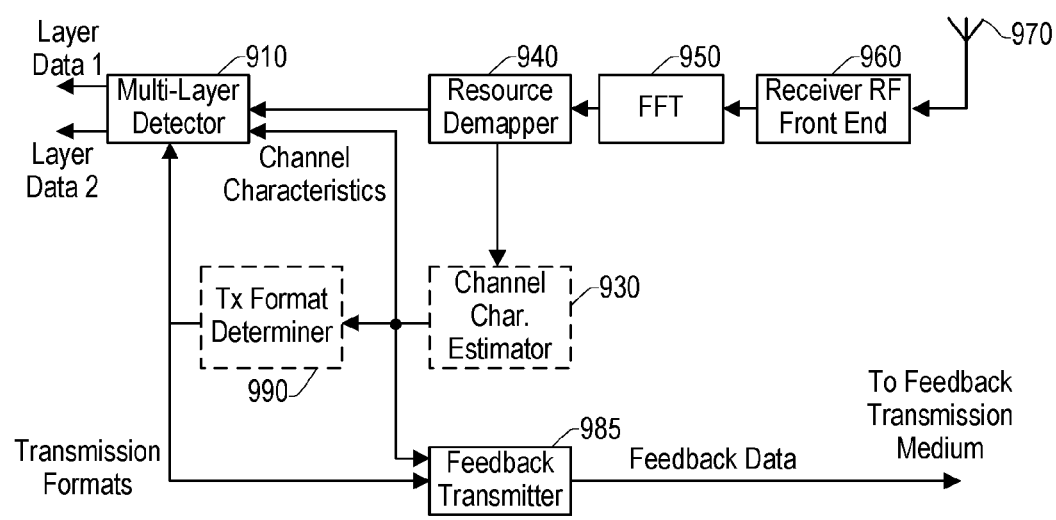
FIG. 9 is a block diagram of a multi-layer receiver.

FIG. 9 is a block diagram of a multi-layer receiver. The multi-layer receiver 551 of the communication system of FIG. 6 may, for example, be provided by the multi-layer receiver of FIG. 9.

A receiver RF front end 960 receives radio signals via an antenna 970 and performs receiver operations such as amplification, filtering, down conversion, analog to digital conversion, and cyclic prefix removal.

A fast Fourier transform (FFT) 950 processes the signals at its input with FFT operation to generate complex valued frequency domain signals.

A resource de-mapper 940 extracts different T/F resources at FFT block output for processing by subsequent blocks. The extracted signals may for example be channel measurement signals, paging signals, and data signals.

Channel Characteristics Estimation

A channel characteristics estimator (CCE) 930 estimates channel characteristics. Channel characteristics estimation based on channel measurement signals includes techniques such as cross correlation based channel estimation, minimum mean square error (MMSE) type channel estimation, least squares (LS) type channel estimation, and other channel estimation techniques. The ACM aspects described herein may be used without specialized channel estimation processing and do not preclude any channel estimation technique.

CCE may be used for the measurement of channel characteristics prior to layer data transmission. Measurements of channel characteristics prior to layer data transmission may for example be conducted by using dedicated reference signals transmissions for this purpose. Alternatively, measurements of channel characteristics prior to layer data transmission may for example be conducted by using dedicated other channel measurement signals transmitted by transmitter chains.

The signals that will be used for channel characteristics estimation by each of the transmitter chains may be transmitted non-continuously and at different times and using different frequencies. As a result, the CCE 930 may operate at different times and using signals obtained at different frequencies to obtain channel characteristics. For example, in uplink LTE communications, if the sounding reference signals (SRSs) are used for uplink channel estimations, the SRSs may be used at different times. It is also possible that multiple transmitter chains transmit SRSs simultaneously.

CCE may also be used for estimation of channel characteristics to aid decoding during reception of layer data signals. In this case, channel characteristics may be estimated by using one or more of layer data signals, reference signals, and other transmitted signals control and data signals.

The estimates obtained by CCE prior to layer data transmission may be used to aid channel characteristics estimation and decoding process during reception of layer data.

The estimates obtained by CCE during layer data transmission may be used to aid channel characteristics estimation for a future ACM Procedure. For example such estimates may be used as TFD inputs.

The CCE may combine measurements from different times to obtain an improved channel characteristics estimate.

In an alternate aspect, the CCE may operate on time domain received signals, that is, signals received but not yet processed by the FFT function.

In a TDD system, for example, the CCE functionality may exist at the transmitter chains and may be used to obtain channel characteristics estimates. Channel characteristics obtained via the CCE at the transmitter chains may be used as an input to TFD operation.

Furthermore, in a TDD system the channel characteristics obtained via receivers co-located with the transmitter chains at the transmitter chains may be transmitted to the multi-layer receiver to aid its reception. As a result of such information provided to it, the multi-layer receiver may not need to determine channel characteristics to aid its reception of layer data. In an aspect, to facilitate its reception, the multi-layer receiver may use both the channel characteristics obtained at the transmitter chains via receivers co-located with the transmitter chains and transmitted to the multi-layer receiver, and its own channel characteristics estimates obtained by its CCE block by operating on the signals that contain the layer data transmissions. Alternatively, to facilitate its reception, the multi-layer receiver may only use the channel characteristics obtained by its CCE block by operating on the received signals that contain the layer data transmissions.

Transmission Format Determination

The transmission format determiner 990 determines transmission formats to be used by each of the transmitter chains. The transmission format may include the mapping that will be used by each of the transmitter chains.

The transmission format determiner 990 inputs may include the channel characteristics for each of the channels between the transmitter chains and the multi-layer receiver, the modulation to be used for transmissions by each of the transmitter chains, and mapping options among which the transmission format determiner 990 will choose a mapping for transmissions by each of the transmitter chains.

The modulation for each of the transmitter chains may be the same for all of the transmitter chains. Alternatively, the modulation may be specified independently for each of the transmitter chains.

The number of mapping options for each of the transmitter chains may be the same for all of the transmitter chains. Alternatively, the number of mapping options for each of the transmitter chains may be specified independently for each of the transmitter chains.

The mapping options may be a plurality of amplitude scaling options and a plurality of phase adjustment options.

For example, there may be three amplitude scaling options: a first amplitude scaling option in which the amplitude is doubled, a second amplitude scaling option in which the amplitude is unchanged, and, a third amplitude scaling option in which the amplitude is decreased by half. Similarly there may be three phase adjustment options: a first option in which the constellation is adjusted by 45 degrees, a second option in which the constellation is not adjusted, and a third option in which the constellation is adjusted by −45 degrees.

The mapping options may be a plurality of amplitude scaling options while using a single constant phase adjustment option. The phase adjustment may be zero degrees. The mapping options may be a plurality of phase adjustment options while using a single constant amplitude scaling option. The amplitude scaling may be no amplitude change (i.e., unity amplitude scaling).

Modulation may be determined elsewhere in the system using a known approach, and the transmission format determiner 990 determines the best mapping.

Figure 10:
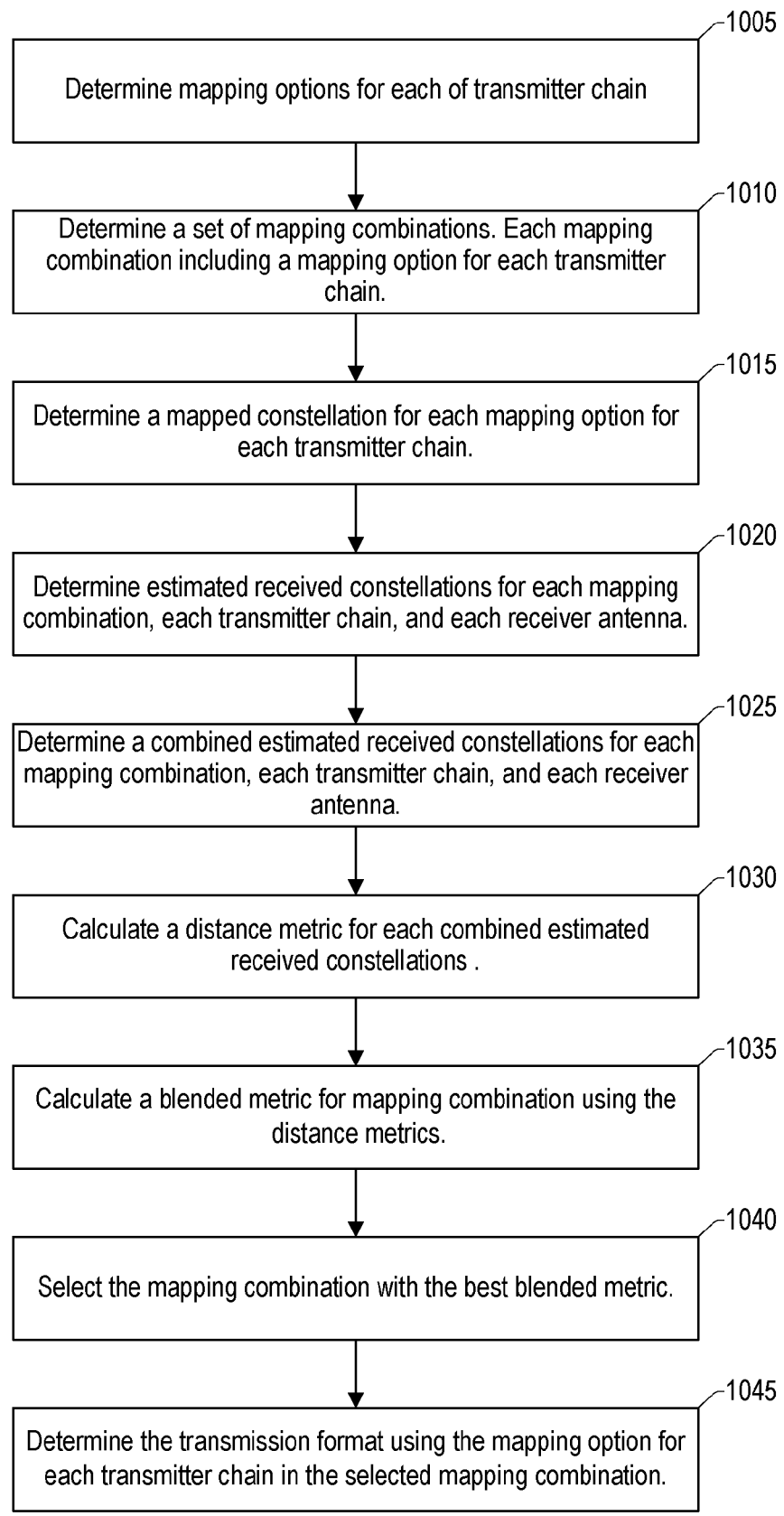
FIG. 10 is a flowchart of a process for transmission format determination.

FIG. 10 is a flowchart of a process for transmission format determination. The process may be used to perform step 720 of the process for adaptive constellation mapping communications of FIG. 7. Aspects of the process of FIG. 10 will be described with reference to the transmission format determiner (TFD) 990; however, the process may be performed by any suitable device or combination of devices. The process of FIG. 10, for a given set of modulations for the transmission chains, determines mappings for adaptive constellation mapping.

In step 1005, the process determines mapping options for each transmitter chain. The mapping options are the amplitude scalings and phase adjustments that will be analyzed. For some transmitter chains, the mapping options may include only amplitude scalings or only phase adjustments. In an aspect, the process creates the mapping options as combinations of possible amplitude scalings and possible phase adjustments that may be employed by each of the transmitter chains. To illustrate the construction of the mapping options, let us consider a system with two transmitter chains each with two amplitude scaling options and two phase adjustment options. For two amplitude scaling options and two phase adjustment options there are four mapping options for each transmitter chain where each mapping option has one amplitude scaling value and one phase adjustment value. Alternatively, the mapping options may not include all possible mappings for a transmitter chain.

In step 1010, the process creates a set of mapping combinations using the mapping options from step 1005. The each mapping combination has one mapping option for each transmitter chain. The set of mapping combinations may include all combinations of mapping options. To illustrate the construction of the set of mapping combinations, let us consider the previous example in which each transmitter chain had four mapping options. Each combination in the set of mapping combinations includes one mapping option for the first transmitter chain and one mapping option for the second transmitter chain. Thus, for this example, there are a total of 4×4=16 combinations in the set of mapping combinations.

In step 1015, for each transmitter chain and each mapping option associated with the transmitter chain, the process determines mapped constellations by applying the mapping option (e.g., amplitude scaling and phase adjustment) to the constellation for the transmitter chain. The same mapping is applied to all constellation points in a constellation used by a transmitter chain. At the end of this step, a set of mapped constellations for all of the transmitter chains is obtained for each mapping option. Referring back to the earlier example, consider the case where each of the two transmitters is using a QPSK constellation. Each of the 16 mapping combinations in the set of mapping combinations is applied to the corresponding QPSK constellation of the two transmitters. For example, consider one example mapping combination from an example set of mapping combinations applied to two QPSK transmitters:

|  | Amplitude Scaling | Phase Rotation |
| --- | --- | --- |
| Transmitter A | 0.5 | +45 degrees |
| Transmitter B | 1.5 | −45 degrees |

A traditional QPSK constellation may be depicted as the set of four complex values as follows:
(+0.707 +0.707j), (−0.707 +0.707j), (−0.707 −0.707j), (+0.707 −0.707j)
where the value 0.707 is an approximation of sqrt(2)/2.

Applying the mapping combinations to the QPSK constellations yields the following modified constellations:
Transmitter A (+0.000 +0.500j), (−0.500 +0.000j), (−0.000 −0.500j), (+0.500 −0.000j)
Transmitter B (+1.500 +0.000j), (−0.000 +1.500j), (−1.500 −0.000j), (+0.000 −1.500j)

In step 1020, for each receiver antenna, each transmitter chain, and each mapping option, the process determines an estimated received constellation. The estimated received constellation is an estimate of how transmission of one of the mapped constellations would be received. The estimated received constellation may be determined by multiplying each constellation point in the mapped constellation (as determined in step 1015) by a CTF estimate between the corresponding transmitter chain and multi-layer receiver antenna.

In step 1025, for each receiver antenna, the process determines a set of combined estimated received constellations. Each combined estimated received constellation being for one combination of the set of mapping combinations. The combined estimated received constellation can be formed by vector summation of all combinations of the complex I-Q values of estimated received constellations related all transmitter chains.

The number of constellation points used in each vector summation is the number of transmitter chains. The number of constellation points in the combined estimated received constellation is the product of the number of constellation points in each of the estimated received constellations. For example, in the case where two transmitter chains each transmit QPSK signals, a summation consists of two I-Q constellation points, one from each of the two transmitters. The combined estimated received constellation in this example has 4×4=16 constellation points. The combined estimated received constellation represents the constellation that would be observed at the receiving antenna in the absence noise if the specific combination of the set of mapping combinations were used.

In step 1030, for each receiver antenna and each combined estimated received constellations, the process determines a distance metric. An example distance metric is the minimum Euclidian distance between constellation points of a combined estimated received constellation. This may be determined, for example, by:

Representing each complex-valued constellation point of a combined estimated received constellation on a Cartesian representation of the I-Q values;

Determining the Euclidian distance between all possible pairs of the constellation points in the combined estimated received constellation; and Selecting the minimum distance result.

Alternatively, the distance metric may be the average of the Euclidian distances between all possible pairs of the constellation points. Alternatively, the distance metric may be a weighted average of the Euclidian distances between all possible pairs of the constellation points where the weighing of each Euclidian distance may be a decreasing function of the magnitude of the Euclidian distance. Alternatively, in the above distance metric calculations, the distance metric may be based on an absolute value based distance instead of the Euclidian distance. The absolute value based distance between two constellation points may be defined as the sum of the absolute value of the difference between real parts of complex numbers corresponding to two constellation points and the absolute value of the difference between imaginary parts of complex numbers corresponding to two constellation points. The absolute value based distance between two constellation points may also be defined as a weighted sum of the maximum value and the minimum value of a set. The set may have the following elements: the absolute value of the difference between the real parts of the two constellation points and the absolute value of the difference between the imaginary parts of the two constellation points.

In step 1035, for each combination in the set of mapping combinations, the process determines a blended metric. The blended metric combines, the distance metrics obtained for individual receive antennas of the multi-layer receiver. A blended metric may, for example, be the sum of all distance metrics for each antenna of the multi-layer receiver. Alternatively the blended metric may, for example, be the minimum of all distance metrics for each antenna of the multi-layer receiver. There is one blended metric per combination in the set of mapping combinations.

In step 1040, the process selects a combination of the set of mapping combinations based on the blended metrics. The TFD may choose the winning combination associated with the most desirable (best) blended metric. For example, the TFD may select the combination from the set of mapping combinations with the largest blended metric.

Consider the case that the distance metric is the minimum of the Euclidian distance between all possible pairs of all of the constellation points in the combined estimated received constellations at each antenna of the multi-layer receiver, and the blended metric is the minimum of all distance metrics. In such a case, the use of maximum blended metric leads to a first order approximation for the reduction of symbol error rate upon reception. It is known that the symbol error rate of a constellation, to a first order approximation, is related to the distance between constellation pairs and thus a constellation that has higher minimum distance is expected to produce better symbol error rate performance.

In step 1045, the mappings pertaining to the selected combination are then designated as components of the transmission format for each of the transmitter chains.

The Feedback Transmitter

The feedback transmitter 985 transmits feedback data. The feedback transmitter 985 couples the multi-layer receiver with the feedback transmission medium. As such, as discussed with respect to the feedback transmission medium, the feedback transmitter 985 may be a wireless transmitter of the same air interface technology as the ACM transmission, a wireless transmitter of different air interface technology as the ACM Transmission, or a wired communications transmitter.

The Multi-Layer Detector

A multi-layer detector (MLD) 910 performs detection of layer data by operating on the received layer data subcarriers. As illustrated in FIG. 9, the MLD may operate on one receiver chain. An MLD algorithm will be described that also applies to the case of two or more receiver chain signals being fed into the MLD. In FIG. 9, the MLD is shown to produce two outputs, layer data 1 and layer data 2. An MLD algorithm will be described that also applies to three or more layer data outputs provided by the MLD.

The inputs to the MLD include channel characteristics and the transmission formats used by each of the transmitter chains. In an aspect where the channel characteristics estimation is conducted at the MLR and the TFD is performed in the MLR (e.g., by the transmit format determiner 990), the MLD may receive this locally produced information and use it in the detection process.

In aspects where the either the channel characteristics estimation or the TFD is performed outside the MLR, the channel characteristics or transmission format information may be provided to the MLR through transmissions received through the reception path of the MLR shown in FIG. 9. Such information may be carried as a component of scheduling or resource grant signaling, or may be allocated its own format used specifically for transmission of these signals. Separate subcarriers may be allocated for the transmission of this information to the MLR.

Alternatively, in aspects where either channel characteristics estimation or TFD is performed outside the MLR, the channel characteristics and transmission format information may be provided to the MLR through transmissions received through an alternate wireless or a wired communications interface. In such a case, connection of such a wireless communications interface to the multi-layer detector would be evident to one skilled in the art.

In aspects where transmitted narrowband modulated waveforms are modulated with a transformed signal derived from constellation points associated with the values of the data elements (e.g., in SC-FDMA of uplink of a cellular LTE system), a reverse operation of the transformation at the transmitter may be performed as a first step in MLD operation (e.g., Inverse Discrete Fourier Transform (IDFT) operation that may be used to reverse the DFT operation in an SC-FDMA systems).

In one aspect, for each resource element carrying layer data, the Multi-Layer Detector may execute the following steps for detection of the ACM Transmission. One skilled in the art will appreciate that other maximum likelihood (ML) techniques, in addition to the method described herein, may be used for the purpose of multi-layer detection.

First, the MLD forms candidate combinations of all constellation points that may be transmitted by transmitter chains where each candidate combination includes one constellation point from each of the constellations used by each transmitter chain. To illustrate how candidate combinations are constructed, consider a scenario where each of the two transmitter chains transmits one layer data with QPSK modulation. Here we list possible constellation points for each transmitter chains and candidate combinations.

Constellation Points

Transmitter Chain 1 Transmitter Chain 2

$c11=(+0.707 +0.707j)$ $c21=(+0.707 +0.707j)$
$c12=(-0.707 +0.707j)$ $c22=(-0.707 +0.707j)$
$c13=(-0.707 -0.707j)$ $c23=(-0.707 -0.707j)$
$c14=(+0.707 -0.707j)$ $c24=(+0.707 -0.707j)$

Candidate Combinations
(c11, c21), (c11, c22), (c11, c23), (c11, c24)
(c12, c21), (c12, c22), (c12, c23), (c12, c24)
(c13, c21), (c13, c22), (c13, c23), (c13, c24)
(c14, c21), (c14, c22), (c14, c23), (c14, c24)

Here the value 0.707 is an approximation of sqrt(2)/2. Thus, for each resource element it is possible to have 16 candidate combinations of transmitted constellation points where each of the candidate combinations is formed by pairing a possible QPSK constellation point from transmitter chain 1 with a possible QPSK constellation point from transmitter chain 2.

Second, for each of the candidate combinations, a mapped candidate signal vector is obtained. Each entry of the mapped candidate signal vector is obtained by multiplying the complex number representation of the constellation point for each of the transmitter chain in the candidate combination with the mapping used for each transmitter chain.

Third, for each of the candidate combinations, a reception metric between the received resource element value at each of the MLR antennas and the candidate reception point at each of the MLR antennas may be calculated by following the steps described below.

In step A, a channel transformed signal vector is calculated by multiplying each entry of the mapped candidate signal vector by the corresponding complex CTF estimate between the each transmitter chain and the MLR antenna.

In step B, the entries of the channel transformed signal vector are summed to obtain a candidate reception point. The candidate reception point is a complex number.

In step C, the reception metric between the received resource element value and the candidate reception point is calculated. The reception metric may, for example, be the Euclidian distance between the Cartesian representations of the complex numbers corresponding to received resource element value and each candidate reception point.

The reception metric may, for example, be the sum of the following two terms:
The absolute value of the difference between the real parts of the complex resource element value and the candidate reception point; and
The absolute value of the difference between imaginary parts of the complex resource element value and the candidate reception point.

Fourth, for each of the candidate combinations, a blended reception metric is calculated by evaluating the reception metrics at each of the MLR antennas. The blended reception metric may for example be formed by summing all the reception metrics at each of the MLR antennas. Alternatively, the blended reception metric may for example be the minimum of all the reception metrics at each of the MLR antennas. Alternatively, the blended reception metric may for example be the maximum of all the reception metrics at each of the MLR antennas.

Fifth, the candidate combination with the best blended reception metric (e.g., the smallest metric value representing a smallest distance) is the chosen combination. Constellation points of the chosen combination for each of the transmitter chains are declared as the detected constellation points for each of the transmitter chains.

Sixth, the detected constellation point information is converted to digital information (e.g., data bits) and output from the multi-layer detector.

In another aspect, the MLD computational complexity may be reduced by reusing repetitive aspects of the detection process. For example, for groups of resource elements where the modulation for each of the transmitter chains does not vary (or is known to vary across a finite number of options), the formation of candidate combinations may be performed only once and may be used for all the resource elements. Similarly, the MLD may be preprogrammed with combinations for all modulations, specific constellation points, and quantity of transmitter chains.

Alternatively or additionally, for resource elements using the same modulations and the same mapping, a mapped candidate signal vector may be obtained once and used for all such resource elements.

Alternatively or additionally, for resource elements using the same modulations, the same mapping, and same CTF values for transmissions of all transmitter chains, the channel transformed signal vector may be obtained once and used for all such resource elements.

In an alternate aspect, techniques such as successive interference cancellation (SIC) may be used for multi-layer detection.

In an alternate aspect, other reception techniques such as equalization based CTF inversion, for example, forcing cross-layer interference to zero (Zero Forcing Equalizer), or equalizers based on minimum mean squared error (MMSE Equalizer) may be used.

In an aspect, a decision process may be used to decide whether an ACM procedure should be used or an alternate transmission technique should be used. The decision process may, for example, utilize the CTF values or other channel characteristics between the transmitter chains and the MLR antennas. The alternate transmission technique may, for example, be a MIMO transmission where the choice of precoding may be made by building codebooks based on singular value decomposition, and where the number of transmitted layer data is limited to being less than or equal to the minimum of transmit and receive antennas.

In an aspect, if a blended metric obtained during TFD is below a decision threshold (or above a threshold, depending on the sense of the metric), a decision to not commence with ACM procedure may be made, and an alternate transmission technique may be used.

Alternatively, a first error rate estimation may be determined under a first hypothesis that the ACM procedure is to be used, and a second error rate may be estimated based under the second hypothesis that an alternate transmission technique is to be used. The hypothesis with lower error rate estimate may then be chosen and used.

ACM error rate estimation may, for example, be based on a look up table operation where the look-up index is a function of the blended metric value obtained in the TFD procedure. The estimation of error rate in an alternate (e.g., traditional) MIMO technique that may be used as an alternate transmission technique would be apparent to one skilled in the art.

In an aspect, the above decision process may take estimates of power consumption for candidate techniques into consideration. For example in the aspect that addresses the downlink simultaneous multi-access node transmission scenario, the receiver is located in a mobile terminal. In such a case, power consumption and battery life may be a key consideration. Receiver power consumption estimates for the ACM procedure and an alternate transmission technique under consideration may be made and the technique with lesser power consumption may be chosen. Furthermore, a weighted benefit function involving power consumption and error rate for the ACM procedure and an alternate transmission technique may be used to determine the favorable transmission technique.

In an aspect, the above decision process may take into consideration the noise level impacting reception by the MLR. The decision process may follow a portion of the TFD process described earlier in this document where a distance metric for the winning combination of the set of mapping combinations is obtained. The decision of whether to use the ACM procedure may be based on the distance metric for the winning member of the set of mapping combinations and a noise metric value that is a measure of the severity of noise impacting the MLR. The noise metric value may be proportional to the range of expected excursions of received constellation points around the combined estimated received constellation points due to noise. For example in a high SNR operation scenario, noise metric value would be smaller than in the case of low SNR operation scenario.

The noise metric value may for example be determined based on statistics of excursions of received constellation points around combined estimated received constellation points due to noise. Characterization of statistics of excursions may be based on observing and recording the excursions. One or more of statistical characterization parameters such as standard deviation, mean, 1-sigma range, 2-sigma range, or 3-sigma range may be used in determining noise metric value.

In the case that the distance metric is the minimum of the Euclidian distances between all possible pairs of all of the constellation points in the combined estimated received constellations at each antenna of the multi-layer receiver, and the blended metric is the minimum of all distance metrics, ACM may for example be used if the blended metric is larger than a multiple of, for example twice, the noise metric value. The noise metric value maybe based upon performance goals. For example, usage of a 3 sigma value compare to usage of 1 sigma value leads to higher performance ACM operation at the expense of using alternate techniques for a comparatively larger number of scenarios.

Alternatively, the noise metric value may be estimated by using a mapping of an indirectly measured noise level parameter. A lookup table may be used to map a measured noise level to a noise metric value. Indirect measurement of noise level parameter may be obtained during a CTF estimation process. Alternatively, indirect measurement of noise level parameter may be obtained by RF front end signal measurements that may be obtained offline by the MLR while there is no transmission. Alternatively, indirect measurement of noise level parameter may be obtained by using parameters that may be available in a receiver such as SNR, SINR, and root mean square (rms) value of received noise.

Conditional ACM

Figure 11:
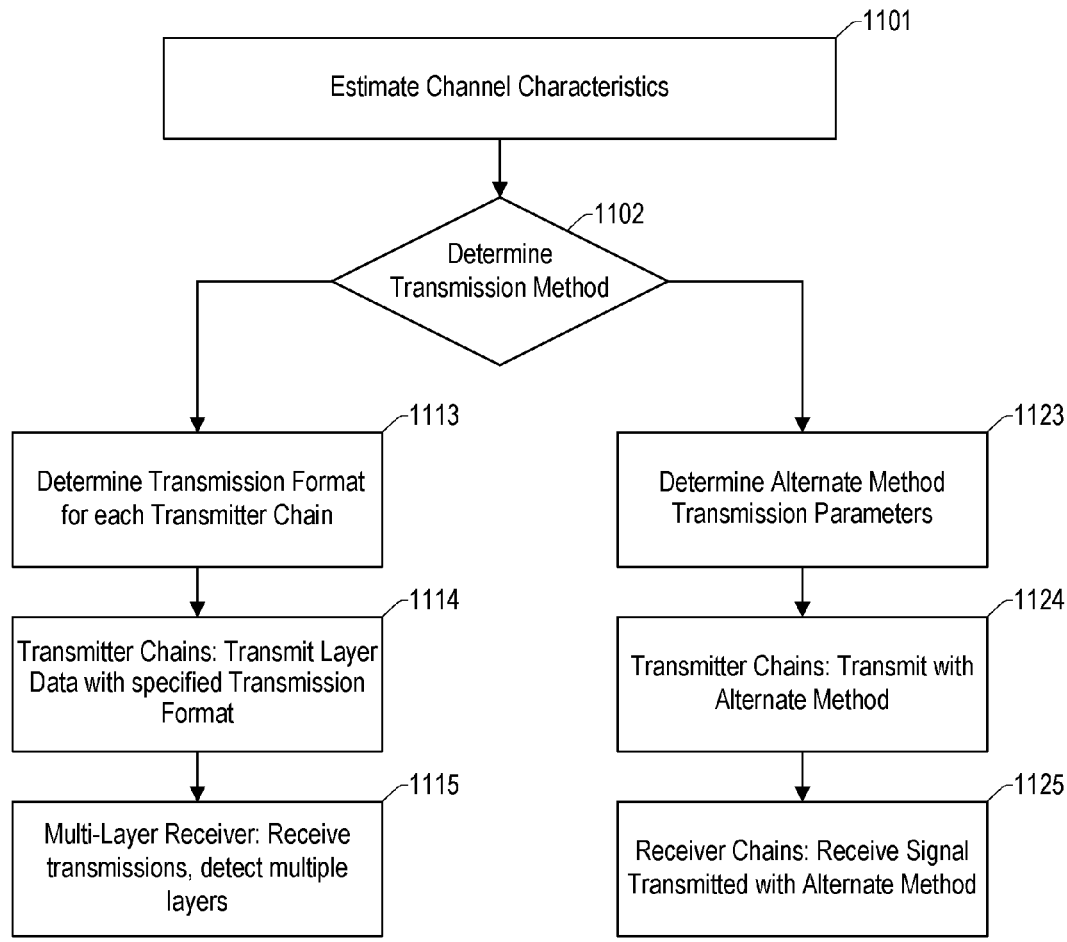
FIG. 11 is a flowchart of a conditional adaptive constellation mapping process.

FIG. 11 is a flowchart of a conditional adaptive constellation mapping process. Aspects of the process of FIG. 11 will be described with reference to the transmission format determiner (TFD) 990; however, the process may be performed by any suitable device or combination of devices. Aspects of the process are similar to corresponding aspects of the process for adaptive constellation mapping communications of FIG. 7.

In step 1101, the channel characteristics are obtained. In this step, similar actions may be performed as described for step 710 of FIG. 7.

In step 1102, the transmission method is determined. The transmission method indicates whether ACM should be used or an alternate transmission method should be used. The transmission method may also indicate the transmission format to be used by each transmitter chains if ACM will be used for transmission. The transmission method may contain information about how to implement an alternative transmission method.

In an embodiment, ACM may be the only option and there may not be any consideration given to alternate transmission methods.

The transmission method determination may be co-located in the same device with the MLR or with any of the transmitter chains. Alternatively, the transmission method determination may be conducted on a separate device. In the latter case, the transmission method may be communicated to the MLR using a dedicated message or as a part of another message that carries other information. The transmission method may be sent within a unicast message or a multicast message. The transmission method may be sent as a part of a resource grant message or as a part of a preamble of transmission.

In the case that ACM transmission is the chosen transmission method and the information contained in the transmission method includes transmission formats to be used by the transmitter chains, the transmission format information may be provided to the transmitter chains.

In the case that an alternate transmission method is selected, and the transmission method contains information about how the chosen alternative transmission method should be implemented, parts or all of the transmission method may be provided to the transmitter circuitry. Such information may include one or more of: (a) antenna configuration for transmit diversity, (b) the layers, if any, which are to be combined prior to being input to the transmitter circuitry, and (c) precoding to be used.

In the case that an alternate transmission method is selected, information that will enable the reception of and detection of transmitted signals may be provided to each receiver that will be used in reception. Such information includes modulation formats, the specification of which layers, if any, are combined prior to transmission, total number of layers, use of precoding selections etc.

The transmission method determination in step 1102 may take advantage of techniques described above, including techniques to take into consideration the noise level, techniques to calculate blended metrics, techniques to determine a winning combination of the set of mapping combinations, and comparing the blended metric for the winning combination with a threshold.

In an embodiment, there may be more than one alternate transmission method that is evaluated in step 1102.

In step 1102, a decision function may compare the blended metric for the winning combination of the set of mapping combinations with a noise metric, and compare one or more metrics of the alternative transmission technique with a threshold. For example, the rank of the CTF estimate matrix may be used as a metric of the alternative transmission technique. The CTF estimate matrix may be comprised of the CTF estimate values between each transmitter antenna (or a group of antennas transmitting in a Tx Diversity mode) that is transmitting a distinct layer and each MLR antenna. The decision function may decide to use ACM transmission when the blended metric for the winning combination of the set of mapping combinations is larger than (e.g., by a factor of 2) the noise metric value or the CTF estimate matrix rank is below a certain threshold.

Other examples of a metric of the alternative transmission technique include (a) the smallest singular value of the CTF estimate matrix for the intended alternative transmission technique, or (b) the ratio of largest to smallest singular values of CTF estimate matrix. The decision function may then decide to use ACM transmission when the blended metric for the winning combination of the set of mapping combinations is larger than (e.g., by a factor of 2) the noise metric value, or, the smallest singular value of the CTF estimate matrix is below a threshold value, or, the ratio of largest to smallest singular values of CTF estimate matrix is above a second threshold value.

In step 1102, the decision function may decide to use ACM by comparing the matrix norm of the CTF estimate matrix to a threshold value. The matrix norm may, for example, be obtained by summing the absolute values of all CTF estimate values between all combinations of transmitter chains and receiver antennas. An alternate matrix norm may be computed in multiple steps, for example, by first calculating the sum of absolute values of CTF estimate values between all transmitter chains and each receiver antenna, and second, finding the minimum sum for all receiver antennas.

In step 1102, the number of mapping options for each of the transmitter chains may be restricted to one. The ACM transmission is performed on an opportunistic basis when channel characteristics provide favorable transmission conditions without any further efforts to select a mapping from multiple mapping options. Although the multiple mapping options may provide better opportunities for higher fidelity transmission, the use of a single mapping option may reduce implementation complexity, eliminate of the need to transmit a transmission format and may be favorable in some communications scenarios. Alternatively, step 1102 may restrict the mapping options to determine whether to use ACM transmission with the process then optimizing the ACM transmission over a larger set of mapping options when ACM transmission is selected.

The chosen mapping option for each of the transmitter chains may be all equal, for example, a unity amplitude and zero phase mapping. Alternatively, based on the channel conditions, a different predetermined gain for each channel may be used. For example for a transmitter for which the channel loss is higher, a high gain amplitude mapping level may be used.

In the case that ACM is selected in step 1102, the process proceeds to step 1113 in which transmission formats that will be used by transmitter chains are determined, for example, using the TFD operation described previously. If the transmission method determined in step 1102 contains the transmission formats for ACM transmission, step 1113 may be omitted.

In step 1114, the transmitter chains transmit layers at their input by using ACM transmission. This step may the same or similar to step 730 of the process of FIG. 7.

In step 1115, the multi-layer receiver receives the transmissions and performs detection to recover layers transmitted by transmitter chains. This step may the same or similar to step 740 of the process of FIG. 7.

In the case that an alternate transmission method is selected in step 1102, then process proceeds to step 1123 in which transmission parameters for the chosen alternative transmission method are obtained. If the transmission method determined in step 1102 contains the transmission parameters for the alternate transmission method, then step 1123 may be omitted.

In step 1124, layers are transmitted with alternate transmission method. The alternate transmission method may, for example, use techniques described above.

In step 1125, a receiver receives the transmissions made with the alternate transmission method and performs detection to recover transmitted layers.

Transmit Arrangement

Figure 12:
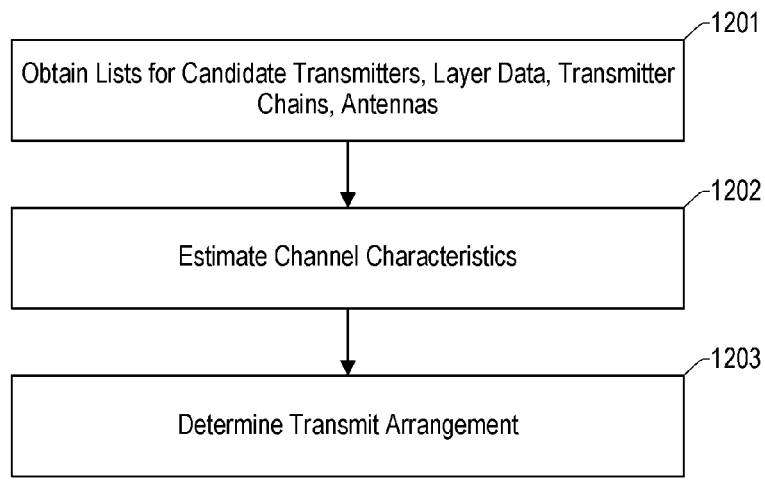
FIG. 12 is a flowchart of a transmit arrangement process.

FIG. 12 is a flowchart of a transmit arrangement process. The transmit arrangement may specify (1) the transmitters that will be a part of an ACM transmission, (2) the number of layers that will be transmitted by each of the transmitters, (3) the transmitter chains that will be used by each the transmitters, and (4) antennas that will be connected to each of the transmitter chains that will be used to transmit layers.

The transmit arrangement determination may be co-located in the same device with the MLR, with any of the transmitter chains, or at a location external to MLR and transmitter chains. Alternatively, parts of the transmit arrangement process may be conducted at different locations.

If the transmit arrangement is determined outside the MLR, the transmit arrangement information may be provided to the MLR to assist reception. In the case that the transmit arrangement procedure produces transmission formats to be used by the transmitter chains, the transmission format information may be provided to the transmitter chains.

Transmit arrangement and transmission format may either be sent separately or within the same message. They may be sent in a dedicated message or as a part of another message that also carries other information. They may be sent within a unicast message or a multicast message. They may be sent as a part of a resource grant signal, or as a part of a preamble of transmission.

The transmit arrangement procedure may be conducted as a part of radio resource allocation and scheduling processing or as a part of medium access control (MAC) related processing.

In step 1201 of the transmit arrangement procedure, one or more of the following may be obtained:
 (a) a list of all candidate transmitters that may be a part of ACM transmission;
 (b) a list of the number of candidate layers that may be transmitted by each candidate transmitter;
 (c) a list of candidate transmitter chains for each candidate transmitter; and
 (d) a list of candidate antennas that may be connected to each of the candidate transmitter chains.

In step 1202, channel characteristics between candidate antennas and the MLR antennas are obtained. In this step, similar actions may be performed as described in the step 710 of FIG. 7. Channel characteristics may be obtained for all or a subset of candidate antennas of all or a subset of candidate transmitter chains.

In step 1203, a transmit arrangement procedure may be used to determine transmit arrangement. The transmit arrangement optimization process may involve one or more of the following four optimizations:
 (i) Antenna selection: selection of the antennas to be used for each of the transmitter chains used to transmit;
 (ii) Transmitter chains selection: selection of the transmitter chains that will transmit;
 (iii) Number of layers: selection of the number of layers that will be transmitted by each of the transmitters used to transmit; and
 (iv) Transmitters selection: selection of the transmitters that will be a part of ACM transmission.

The antenna selection optimization may not be needed if the transmitter antenna to be used by each candidate transmitter chain is predetermined.

The transmitter chains selection optimization may not be needed if the number of candidate layers is the same as number of available transmitter chains in all transmitters.

The transmitter chains selection optimization is redundant for transmitters for which all antennas of the transmitter are accessible for connection to all transmitter chains. This is because any selection of transmitter chains can reach any of the antennas.

The number of layers optimization may not be needed if the system is designed or configured (e.g., by an operator) such that an ACM transmission transmits all candidate layers in all transmitters.

The transmitters selection optimization may not be not needed in embodiments where there is a single transmitter (e.g., uplink SU-MIMO-SM, downlink MU-MIMO-SM, and downlink SU-MIMO-SM).

Antenna Selection Optimization

Here we describe an example embodiment for antenna selection optimization assuming the following aspects are predetermined: (A) the transmitters, (B) the number of layers to be transmitted by each the transmitters, and (C) the transmitter chains that will be used in each transmitter.

In antenna selection optimization, first a set of selections of candidate antennas may be constructed. Second, an antenna selection metric may be obtained for each of the selections. Third, the selection with the best metric is chosen.

A selection of candidate antennas is one set of possible mappings between individual antennas and a transmitter chain, for all of the candidate transmitter chains. A mapping may be, for example, an individual antenna connected to a transmitter chain. An alternative mapping, for example, may be two or more candidate antennas connected to a transmitter chain in a transmitter diversity or beamforming fashion.

The antenna selection metric for a specific selection of candidate antennas may be obtained by using the channel characteristics associated with the use of this selection of candidate antennas (in conjunction with the other configuration parameters that are predetermined) in performing the steps described for TFD. The metric may be the blended metric for the winning combination of the set of mapping combinations.

The set of selections of candidate antennas may be all possible selections of candidate antennas or may be a subset of all possible selections of candidate antennas.

Alternatively, the antenna selection optimization may process the set of selections of candidate antennas sequentially and select the first selection having a metric better than a threshold value.

Transmitter Chains Selection Optimization

Here we describe an example embodiment for transmitter chains selection optimization assuming the following aspects are predetermined: (A) the transmitters; (B) the number of layers to be transmitted by each the transmitters; and (C) the transmitter antennas that will be used by each transmitter chain.

In transmitter chains selection optimization, first a set of selections of candidate transmitter chains may be constructed. Second, a transmitter chains selection metric may be obtained for each of the selections. Third, the selection with the best metric is chosen.

A selection of candidate transmitter chains is a set of possible mappings of transmitter chains to the layers for all the transmitters and layers. For example in a situation where there are two transmitters (T1 and T2), each with two layers to be transmitted (T1L1, T1L2, T2L1, and T2L2) through three possible transmitter chains for each transmitter (T1C1, T1C2, T1C3, T2C1, T2C2, and T2C3), a configuration of candidate transmitter chains may be the set (T1C1, T1C3, T2C2, T2C3).

The transmitter chains selection metric for a specific selection of candidate transmitter chains may be obtained by using the channel characteristics associated with the use of this selection of candidate transmitter (in conjunction with the other configuration parameters that are predetermined) in performing the steps described for TFD. The metric may be the blended metric for the winning combination of the set of mapping combinations.

The set of selection of candidate transmitter chains may be all possible selections of candidate transmitter chains or may be a subset of all possible selections of candidate transmitter chains.

Alternatively, the transmitter chains selection optimization may process the set of selections of candidate transmitter chains sequentially and select the first selection having a metric better than a threshold value.

Number of Layers Optimization

In an aspect, the number of layers optimization may be supplied with the following configuration parameters: (A) the transmitters involved in the ACM transmission; (B) association of each layer with a specific transmitter chain; and (C) antenna(s) that will be used by each transmitter chain. In this scenario, the number of layers optimization may be conducted as follows. First a set of configurations of candidate layers may be constructed. Second, a layers configuration metric may be obtained for each of the configurations. Third, the configuration with the best metric is chosen.

A configuration of candidate layers is the combination of the number of layers transmissions assigned to each and every transmitter involved in the ACM transmission. For example, consider a scenario with 4 transmitters (T1, T2, T3, and T4), each transmitter having the capability to transmit one or two data layers. A configuration may be described as (2, 1, 1, 2) where each number represents the quantity of layers associated with the corresponding transmitter (T1, T2, T3, T4).

The layers configuration metric for a specific configuration of candidate layers may be obtained by using the channel characteristics resulting from the use of this configuration of candidate layers (in conjunction with the other configuration parameters that are predetermined) in performing the steps described for TFD. The metric may be the blended metric for the winning combination of the set of mapping combinations.

The set of configurations of candidate layers may be all possible configurations of candidate layers or may be a subset of all possible configurations of candidate layers.

Alternatively, the layers configuration optimization may process the set of configurations of candidate layers sequentially and select the first having a metric better than a threshold value. In this latter approach, the optimization may evaluate configurations starting with the choice having the largest number of total layers (the sum of the number of data layers for each transmitter, summed over all transmitters involved in the ACM transmission). If this first choice does not meet the threshold value, then the choice having the next largest number of total layers is evaluated, and so on. This has the effect of maximizing the number of transmitted layers, and hence, the system capacity, while still meeting a minimum performance metric value.

In the case that the ACM transmission involves less than the maximum number of layers, layer data that are not included in ACM transmission may for example be transmitted through resource allocation to other time/frequency resources.

Transmitter Selection Optimization

In an aspect, the transmitter selection optimization may be supplied with the following configuration parameters: (A) the number of layers is assigned to each transmitter; (B) association of layers to transmitter chains; and (C) antenna that will be used by each transmitter. In this aspect, the transmitter selection optimization may be conducted as follows. First, a set of configurations of candidate transmitters may be constructed. A configuration may include a combination having all possible transmitters, or various combinations of fewer than all possible transmitters. Second, a metric may be obtained for each of the configurations. Third, the configuration with the best metric is chosen.

The metric for a configuration of candidate transmitters may be obtained by using the channel characteristics resulting from the use of this configuration of candidate transmitters (in conjunction with the other configuration parameters that are predetermined) in performing the steps described for TFD. The metric may be the blended metric for the winning combination of the set of mapping combinations.

The set of candidate transmitters may be all possible candidate transmitters or may be a subset of all possible candidate transmitters.

Alternatively, the transmitters configuration optimization may process the set of configurations of candidate transmitters sequentially and select the first configuration having a metric better than a threshold value. In this latter approach, the optimization may evaluate configurations starting with the configuration having the largest number of transmitters (all possible transmitters). If this first configuration does not meet the threshold value, then the configuration having the next largest number of transmitters is evaluated, and so on. This has the effect of maximizing the number of transmitters being used for ACM, and hence, the system capacity, while still meeting a minimum performance metric value.

In the case that the ACM transmission involves less than the maximum number of transmitters, the layers of transmitters that do not participate in ACM may, for example, be transmitted through resource allocation to other time/frequency resources.

Combined Optimizations

As previously described, step 1203 may be based on one of the four optimizations above. In a further aspect, step 1203 of FIG. 12 may be based on a combination of two or more of the optimizations above.

For example, the transmit arrangement optimization of step 1203 may be performed by a repetitive manner in which the transmitter chain configurations optimization (inner loop) is repeated for each of configuration of candidate layers of the number of layers optimization (outer loop). The repetitive optimization would then select the combination of configuration of candidate layers and the selection of candidate transmitter chains having the best metric.

The set of optimizations may be performed jointly. In a joint optimization, first a set of joint hypotheses may be constructed. Second, a metric may be obtained for each of the joint hypothesis. Third, the joint hypothesis with the best metric is chosen.

For example, the antenna selections and transmitter chains may be optimized jointly. In this example, the transmitters that will transmit and number of layers for each used transmitter are predetermined and provided to the system implementing this procedure.

A joint hypothesis of antenna selections and transmitter chains may be represented as a set of pairs. For each pair, the first entry of the pair may be a transmitter chain choice and the second entry may be an antenna selection. Each pair is for a specific combination of transmitter and a layer to be transmitted by the transmitter. For example in a situation where there are two transmitters (T1 and T2) each with two layers to transmit (T1L1, T1L2, T2L1, and T2L2) through 3 possible transmitter chains for each transmitter (T1C1, T1C2, T1C3, T2C1, T2C2, and T2C3), and there are two possible antennas for each chain (T1C1A1, T1C1A2, T1C2A1, T1C2A2, T1C3A1, T1C3A2, T2C1A1, T2C1A2, T2C2A1, T2C2A2, T2C3A1, T2C3A2), a joint hypothesis of candidate transmitter chains and antennas may be:

(T1C1, T1C1A1) for transmission of first layer from T1;
(T1C2, T1C2A2) for transmission of second layer from T1;
(T2C2, T2C2A2) for transmission of first layer from T2; and
(T2C3, T2C2A1) for transmission of second layer from T2.

The joint hypothesis metric for a specific joint hypothesis may be obtained by using the channel characteristics associated with the use of this joint hypothesis (in conjunction with the other hypothesis parameters that are predetermined) in performing the steps described for TFD. The joint hypothesis metric may be the blended metric for the winning combination of the set of mapping combinations.

The set of joint hypotheses of antenna selections and transmitter chains may be all possible joint hypotheses of antenna selections and transmitter chains or may be a subset of all possible joint hypotheses of antenna selections and transmitter chains.

Alternatively, the joint optimization may process the set of joint hypotheses sequentially and select the first joint hypothesis having a metric better than a threshold value.

One skilled in the art would appreciate how any combination of the four optimizations may be implemented in such a repetitive fashion, using other forms of joint optimization, or alternate iterative optimization techniques.

Downlink Multi-Cell Interference Mitigation with ACM

Consider a downlink multi-cell interference scenario with two access nodes each transmitting one layer to two terminals using overlapping T/F resources as illustrated in FIG. 3. The goal of interference mitigation is to improve the reception quality of layer 1 at terminal 301 in the presence of transmissions of layer 2 by access node 322. At terminal 301, both layer 1 and layer 2 may be recovered by a joint decoding process and layer 2 may be discarded.

Methods for how access nodes and terminals may cooperate to facilitate measurement of channel characteristics, how signaling of transmission formats to transmitter chains may be performed, and locations where TFD may be conducted as described above.

The transmission format of layer 1 and the transmission format of layer 2 may be determined by a joint optimization to minimize the impact of the transmission of layer 2. Here we refer to this type of interference mitigation as preemptive downlink interference mitigation.

In preemptive downlink interference mitigation, the transmission formats to be used by access node 301 and access node 302 are jointly determined. Transmission formats may be determined by choosing among more than one option for transmission formats of transmitter chains in both access node 321 and access node 322. For determining these transmission formats, a TFD operation may be performed where multiple mapping options may be used in constructing the set of mapping combinations of combinations for the transmitter chains of both access node 321 and access node 322. In the TFD operation, distance metrics may be calculated for the receiver antennas at terminal 301. For reception, the MLD uses the transmission formats determined by TFD for transmissions by access node 321 and access node 322.

Alternatively, the transmission format of layer 1 may be determined so as to minimize or reduce the impact of the transmission of layer 2 to the reception of layer 1 by terminal 301 while the transmission parameters of layer 2 are not chosen to minimize impact of transmission of layer 2 to reception of layer 1 by terminal 301. This type of interference mitigation may be referred to as defensive downlink interference mitigation.

In defensive downlink interference mitigation, transmission formats to be used by access node 321 may be determined by choosing among more than one mapping options for transmitter chains of access node 321 while the transmission parameters for access node 322 may, for example, be determined considering only the layer 2 reception performance at terminal 302. A TFD operation may be performed for determining the transmission formats of transmitter chains in access node 321.

In the case that access node 322 transmits ACM signals, the transmission format for transmission by access node 322 may be determined by a second, independent TFD process seeking to improve the reception quality of transmissions by access node 322 at terminal 302. The determined transmission format for transmission by access node 322 by the second TFD operation may be provided to the system block that will conduct the ACM operation for the transmission for access node 321 prior to commencing of the TFD operation to determine the transmission format for access node 321.

In the TFD operation to determine the transmission format for transmitter chains of access node 321, multiple mapping options may be used in constructing the set of mapping combinations of combinations for the transmitter chains of access node 321, and a single mapping value may be used for each of transmitter chains of access node 322 (e.g., the mapping value already determined by a second independent TFD process). In the TFD operation, distance metrics may be calculated for the receiver antennas at terminal 301. For reception, the MLD uses the transmission formats determined by TFD for transmissions by access node 321 and access node 322.

In the case that access node 322 is to transmit according to an alternative technique, the transmission parameters for transmitter chains of access node 322 may be specified in a different format compared to a transmission format used in ACM. In typical communication systems, a modulation format and amplitude and phase precoding values to be used in transmitter chains are specified. This information may be provided to the system block that will conduct the ACM operation for the transmission for access node 321 prior to commencing of the TFD operation to determine the transmission format for access node 321.

In TFD and MLD, the amplitude and phase aspects of the precoding used in the alternate transmission technique may be used in the same way as the amplitude and phase mapping values that would have been used for performing TFD and MLD when both transmissions are using ACM.

Extensions of these methods to scenarios having more than two access nodes, transmissions of more than two layers, and/or more than two terminals would be evident to one skilled in the art.

Uplink Multi-Cell Interference Mitigation with ACM

Consider an uplink multi-cell interference scenario with two terminals each of which transmits one layer to two access nodes using overlapping T/F resources as illustrated in FIG. 4. The goal of interference mitigation is to improve the reception quality of layer 1 at access node 421 in the presence of transmissions of layer 2 by terminal 402. At access node 421, both layer 1 and layer 2 may be recovered by a joint decoding process and layer 2 may be discarded.

Methods for how access nodes and terminals may cooperate to facilitate measurement of channel characteristics, how signaling of transmission formats to transmitter chains may be performed, and locations where TFD may be conducted is provided herein.

The transmission format of layer 1 and the transmission format of layer 2 may be determined by a joint optimization to minimize the impact of the transmission of layer 2. Here we refer to this type of interference mitigation as preemptive uplink interference mitigation.

In preemptive uplink interference mitigation, the transmission formats to be used by terminal 401 and terminal 402 are jointly determined. Transmission formats may be determined by choosing among more than one option for transmission formats of transmitter chains in both terminal 401 and terminal 402. For determining these transmission formats, a TFD operation may be performed where multiple mapping options may be used in constructing the set of mapping combinations of combinations for the transmitter chains of both terminal 401 and terminal 402. In the TFD operation, distance metrics may be calculated for the receiver antennas at access node 421. For reception, the MLD uses the transmission formats determined by TFD for transmissions by terminal 401 and terminal 402.

Alternatively, the transmission format of layer 1 may be determined so as to minimize or reduce the impact of the transmission of layer 2 to the reception of layer 1 by access node 421 while the transmission parameters of layer 2 are not chosen to minimize impact of transmission of layer 2 to reception of layer 1 by access node 421. Here we refer to this type of interference mitigation as defensive uplink interference mitigation.

In defensive uplink interference mitigation, transmission formats to be used by terminal 401 may be determined by choosing among more than one mapping options for transmitter chains of terminal 401 while the transmission parameters for terminal 402 may for example be determined considering only the layer 2 reception performance at access node 422. A TFD operation may be performed for determining the transmission formats of transmitter chains in terminal 401.

In the case that terminal 402 transmits ACM signals, the transmission format for transmission by terminal 402 may be determined by a second, independent TFD process seeking to improve the reception quality of transmissions by terminal 402 at access node 422. The determined transmission format for transmission by terminal 402 by the second TFD operation may be provided to the system block that will conduct the ACM operation for the transmission for terminal 401 prior to commencing of the TFD operation to determine the transmission format for terminal 401.

In the TFD operation to determine the transmission format for transmitter chains of terminal 401, multiple mapping options may be used in constructing the set of mapping combinations for the transmitter chains of terminal 401, and a single mapping value may be used for each of transmitter chains of terminal 402 (e.g., the mapping value already determined by a second independent TFD process). In the TFD operation, distance metrics may be calculated for the receiver antennas at access node 421. For reception, the MLD uses the transmission formats determined by TFD for transmissions by terminal 401 and terminal 402.

In the case that terminal 402 is to transmit according to an alternative technique, the transmission parameters for transmitter chains of terminal 402 may be specified in a different format compared to a transmission format used in ACM. In typical communication systems, a modulation format and amplitude and phase precoding values to be used in transmitter chains is specified. This information may be provided to the system block that will conduct the ACM operation for the transmission for terminal 401 prior to commencing of the TFD operation to determine the transmission format for terminal 401.

In TFD and MLD, the amplitude and phase aspects of the precoding used in the alternate transmission technique may be used in the same way as the amplitude and phase mapping values that would have been used for performing TFD and MLD when both transmissions are using ACM.

Extensions of these methods to scenarios having more than two terminals, transmissions of more than two layers, and/or more than two access nodes would be evident to one skilled in the art.

Alternate TFD Methods

TFD using distance metrics: In TFD, a decision function may determine the winning combination of the set of mapping combinations by evaluating the sets of distance metrics obtained for the antennas of the MLR for all combinations of the set of mapping combinations.

Each set of distance metrics may be evaluated through the application of a deviation function. In an embodiment, the deviation function first calculates the difference between a target value and the distance metric of each antenna. Next, the deviation function computes the deviation value (e.g., standard deviation) of the set of differences. The winning combination may be that combination having the smallest deviation value. In an embodiment, the target value may be zero for all antennas. Alternatively, the target value may be a constant value for all antennas. Alternatively, the target value may have different values for each antenna.

Alternatively, a sum function may be used to evaluate each set of distance metrics. A sum function may create a sum value by summing the distance metrics of all antennas.

Alternatively, the decision function may use both (i) the deviation values, and (ii) the sum values to determine the winning combination of the set of mapping combinations. In an embodiment, first, the deviation values for each combination of the set of mapping combinations may be calculated, and, second, the combination with the largest sum value among a predetermined number of combinations with the smallest standard deviation values may be chosen as the winning combination.

Alternatively, first, deviation values may be calculated, and, second, the combination with the largest sum value among combinations that have deviation values smaller than a threshold may be chosen as the winning combination.

Alternatively, first, sum values may be calculated, and, second, the combination with the smallest deviation among a predetermined number of combinations with largest sum values may be chosen as the winning combination.

TFD Error Rate Metric

In TFD, the winning combination may be based on predicted error rates for each combined estimated received constellation. The predicted error rate for the combined estimated received constellation may be obtained by calculating a weighted sum of predicted error rates of all constellation points of the combined estimated received constellation. The weight to be used for each constellation point may be the probability of the constellation point. In an alternative embodiment, the weights may be based on an a priori scheme to prioritize constellation points The predicted error rate for a constellation point may be obtained by calculating the sum of predicted error rates between the constellation point and all other constellation points. The predicted error rate between two constellation points may be calculated by using the complementary error function with arguments proportional to the Euclidean distance (or an approximation thereof) between constellation points and the noise level in the receiver.

The predicted error rate for a constellation point may also be obtained by calculating the sum of predicted error rates between the constellation point and a subset of other constellation points. The subset of constellation points may be formed choosing a predetermined number of constellation points with smallest Euclidean distance to the constellation point.

The blended metric for predicted error rate may, for example, be the sum of all predicted error rates for each antenna of the multi-layer receiver. Alternatively, the blended metric may, for example, be the maximum of all predicted error rates for each antenna of the multi-layer receiver.

The TFD may choose a winning combination of the set of mapping combinations by evaluating the blended metrics for predicted error rate and choose the combination having, for example, the smallest blended metric.

In an embodiment, the calculation of the complementary error function may be performed via a lookup table.

Multi-Cell Multi-Terminal Uplink Transmission Scenario

Figure 13:
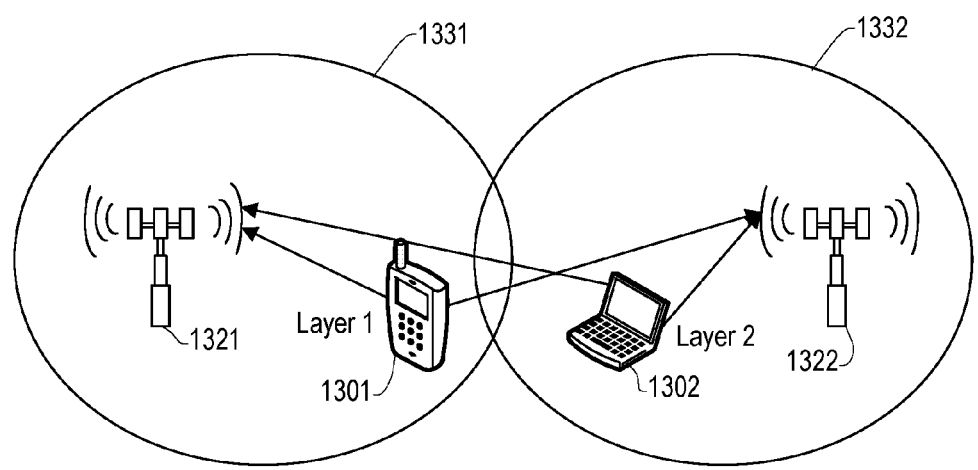
FIG. 13 illustrates a two cell uplink simultaneous multi-terminal transmission scenario.

A cellular communications scenario with two adjacent cells each having an access node and a terminal within the cells is shown in FIG. 13. In FIG. 13, an uplink multi-terminal transmission scenario is presented. In FIG. 13, access node 1321 and access node 1322 are both shown to be exposed to transmission of layer 1 from terminal 1301 in cell 1331 and transmission of layer 2 from terminal 1302 in cell 1332.

The transmission of layer 1 may be intended to be received by only access node 1321 and the transmission of layer 2 may be intended to be received by only access node 1322. In this case, the transmissions of terminal 1301 and terminal 1302 cause interference to access node 1322 and access node 1321 respectively. Since both access node 1321 and access node 1322 are impacted by transmissions intended to be received by each other, we call this scenario "mutual uplink interference."

In an alternate scenario, one or both of the transmissions by terminal 1301 and terminal 1302 may be intended to be received by both access node 1321 and access node 1322. For example, the transmission of layer 1 by terminal 1 may be intended to be received by both access node 1321 and access node 1322, and the transmission of layer 2 by terminal 1302 maybe intended to be received by both access node 1321 and access node 1322. Such a situation may arise in cases where one or both of layer 1 and layer 2 data contain information that is intended to be received by both access nodes.

In an alternate scenario, terminal 1301 and terminal 1302 may each transmit more than one layer where the transmission by a terminal may have distinct layers targeting different access nodes. For example, terminal 1301 may transmit layers L1 and L2 and terminal 1302 may transmit layers L3 and L4 where L1 and L3 may be intended to be received by access node 1321 and L2 and L4 may be intended to be received by access node 1322. Here call this scenario "joint uplink multi cell transmission."

Techniques provided herein may be used to address both mutual uplink interference and joint uplink multi-cell transmission scenarios.

The TFD for uplink simultaneous multi-terminal transmission scenario may use the techniques described herein by treating all the antennas at access node 1321 and access node 1322 collectively as in the scenarios where all antennas are co-located, e.g., SU-MIMO-SM. Transmission formats to be used by transmitter chains of terminal 1301 and terminal 1302 may be determined by a TFD process. The TFD process may compare distance metrics for each receiver antenna or blended metrics for combinations of the set of mapping combinations. The use of a blended metric result may be viewed as equivalent to the TFD process attempting to reach a single performance goal across access node 1321 and access node 1322. For example, selecting a transmit format which maximizes the blended metrics across the set of mapping combinations of combinations where the blended metric is the minimum of distance metrics provides a means to reduce the worst case error across all antennas of access node 1321 and access node 1322.

Alternatively, the goal of having a specific reception quality for the antennas of access node 1321 and access node 1322 may be facilitated through choosing the combination of the set of mapping combinations with the smallest deviation value from a desired set of target values for antennas. For example, consider the case where the each of the distance metrics is obtained as the minimum of the Euclidian distances between constellation points. If it is desirable to have access node 1322 receive data with higher fidelity, higher target values for access node 1322 may be used.

The goal of having similar reception quality across the antennas of access node 1321 and access node 1322 may be facilitated through the use of decision functions based on joint use of standard deviation values and sum of distance metrics values provided herein.

Multi-Cell Multi-Terminal Downlink Transmission Scenario

Figure 14:
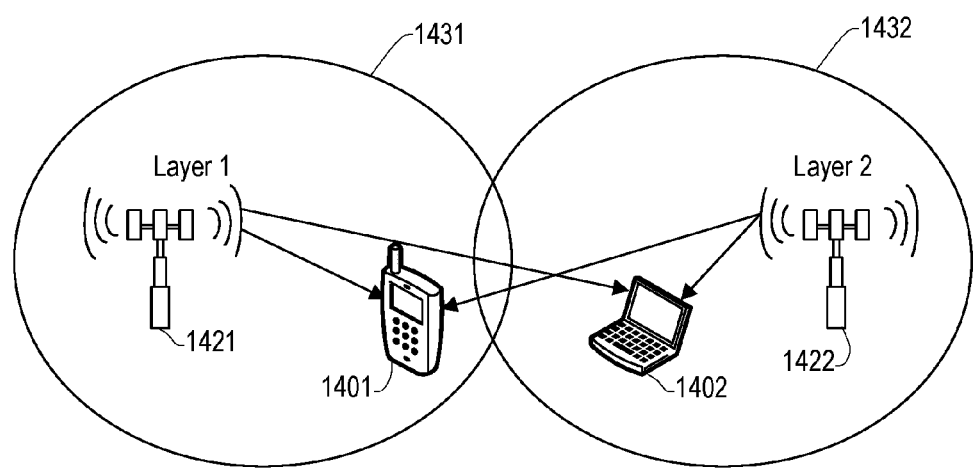
FIG. 14 illustrates a two cell downlink simultaneous multi-access node transmission scenario.

A cellular communications scenario with two adjacent cells each having an access node and a terminal within the cells is shown in FIG. 14. In FIG. 14 a downlink multi-terminal transmission scenario is presented. In FIG. 14, terminal 1401 and terminal 1402 are both shown to be exposed to transmission of layer 1 from access node 1421 in cell 1431 and transmission of layer 2 from access node 1422 in cell 1432.

The transmission of layer 1 may be intended to be received by only terminal 1401 and the transmission of layer 2 may be intended to be received by only terminal 1402. In this case, the transmissions of access node 1421 and access node 1422 cause interference to terminal 1402 and terminal 1401, respectively. Since both terminal 1401 and terminal 1402 are impacted by transmissions intended to be received by each other, we call this scenario "mutual downlink interference."

In an alternate scenario, one or both of the transmissions by access node 1421 and access node 1422 may be intended to be received by both terminal 1401 and terminal 1402. For example, the transmission of layer 1 by access node 1421 may be intended to be received by both terminal 1401 and terminal 1402, and the transmission of layer 2 by access node 1422 maybe intended to be received by both terminal 1401 and terminal 1402. Such a situation may arise in cases where one or both of layer 1 and layer 2 data contain information that is intended to be received by both terminals.

In an alternate scenario, access node 1421 and access node 1422 may each transmit more than one layer where the transmission by an access node may have distinct layers targeting different terminals. For example, access node 1421 may transmit layers L1 and L2 and access node 1422 may transmit layers L3 and L4 where L1 and L3 may be intended to be received by terminal 1401 and L2 and L4 may be intended to be received by terminal 1402. Here we call this scenario "joint downlink multi cell transmission."

Techniques provided herein may be used to address both mutual downlink interference and joint downlink multi-cell transmission scenarios.

The TFD for downlink simultaneous multi-terminal transmission scenario may use the techniques presented herein by treating all the antennas at terminal 1401 and terminal 1402 collectively as in the scenarios where all antennas are co-located (e.g., SU-MIMO-SM).

Transmission formats to be used by transmitter chains of access node 1421 and access node 1422 may be determined by a TFD process. The TFD process may compare distance metrics for each receiver antenna or blended metrics for combinations of the set of mapping combinations. The use of a blended metric result may be viewed as equivalent to the TFD process attempting to reach a single performance goal across terminal 1401 and terminal 1402. For example, selecting a transmit format which maximizes the blended metrics across the set of mapping combinations where the blended metric is the minimum of distance metrics provides a means to reduce the worst case error across all antennas of terminal 1401 and terminal 1402.

Alternately, the goal of having a specific reception quality for the antennas of terminal 1401 and terminal 1402 may be facilitated through choosing the combination of the set of mapping combinations with the smallest deviation value from a desired set of target values for antennas. For example, consider the case where each of the distance metrics is obtained as the minimum of the Euclidian distances between constellation points. If it is desirable to have terminal 1402 receive data with higher fidelity, higher target values for terminal 1402 may be used.

The goal of having similar reception quality across the antennas of terminal 1401 and terminal 1402 may be facilitated through the use of decision functions based on joint use of deviation values and sum values provided in herein.

ACM Transmitter Chain

A transmitter chain in an ACM transmitter may only have transmission equipment and have no feedback receiver. The transmitter chain may use external means to receive transmission format and channel characteristics. The external means may be a separate receiver.

In the case that multiple layers will be transmitted through multiple transmitter chains in an ACM transmitter, the transmitter chains may share a single feedback receiver.

A transmitter that is implemented without consideration for ACM transmission may be used as an ACM transmitter. Such a transmitter may for example be designed according to a wireless standard such as the 3GPP LTE standard. We here call such equipment a legacy transmitter. In a legacy transmitter, the Feedback Receiver for each of the transmitter chains may not be needed. Thus, a transmitter chain may not have the feedback receiver functionality within. The receiver chain of the legacy transmitter for receiving configuration information for the transmitters may be used for receiving the transmission format and channel characteristics. Transmitter chains of a legacy transmitter may have predetermined capability to support different modulations and precoding schemes. Such modulations and precoding schemes may be specific to the wireless standard that the legacy equipment is designed for. Signaling of the precoding scheme to be used by a transmitter chain of a legacy transmitter by the system block that decides such parameters may be similar to or different from the signaling used for transmission format used in ACM.

Hybrid ACM

Legacy transmitters and ACM transmitters may together be used as a part of ACM transmission. Legacy transmitters may be used in a similar manner to ACM transmitters in ACM transmission. In this scenario, some of the transmitters may transmit with precoding schemes defined for ACM, while others may transmit with one of precoding options for which the legacy transmitters are designed (e.g., according to 3GPP LTE standard). ACM transmit formats and legacy transmitters' transmission parameters may be jointly determined by simultaneously considering the precoding options for transmitter chains of legacy transmitters and the mapping options for the transmitter chains of the ACM transmitter. The system scheduling and resource allocator block may use a TFD procedure where channel characteristics, modulation capabilities, and mapping options of both the legacy and ACM transmitters are used to determine the transmission format of ACM and legacy transmitters. The channel characteristics between transmitter antennas of both the legacy transmitters and the receiver antennas of the MLR may be obtained by using techniques that are described herein. The determination of modulation and amplitude and phase precoding formats of legacy transmitters may be determined in the same way that modulations and the mapping options of ACM transmitters are determined. The results of the TFD procedure are signaled to the legacy transmitters in a communication format used by the legacy transmitter. ACM transmitter chains may receive transmission format information in a format specified for ACM transmitter formats.

A scenario where legacy transmitters and ACM transmitters may both participate in ACM transmission is in uplink MU-MIMO-SM. The system scheduler and resource allocator block may, for example, be located in an access node. Some of the terminals that engage in ACM transmission maybe legacy transmitters and the others may be ACM transmitters.

At the MLR, the MLD algorithm may jointly recover all transmitted layers (including both the layers transmitted by ACM and legacy transmitters). The MLD may use transmission formats for the layers transmitted via ACM, and, the modulation, and amplitude and phase aspects of precoding values for layers transmitted by legacy transmitters. Modulation and amplitude and phase mapping values for the transmitter chains of legacy transmitters are used in a similar fashion to the use of mapping options when performing MLD.

Alternative Transmission Method Implementation

In the case that the number of transmitted layers is larger than the number of receiver antennas, an example alternate transmission technique is to combine the data in some of the layers to a smaller number of layers so that the resultant total number of layers to be transmitted is less than or equal to the number of receiver antennas. As a result, precoding techniques that are designed for the cases that number of transmitted layers being less than or equal to the minimum of the number of transmitter antennas and number of receiver antennas may be used. Precoding techniques that are designed for the cases in which the number of layers being transmitted is less than or equal to the minimum of the number of transmitters and the number of receiver antennas would be known to one skilled in the art. Since in this method, some of the layers are combined to a smaller number of layers, the number of required transmitter antennas to support the transmission of distinct layers with overlapping T/F resources is reduced. As a result, some of the transmitter antennas may be used in a beamforming or transmit diversity manner.

In the case that the number of layers to be transmitted is larger than the number of receiver antennas, an example alternate transmission technique is to decide to transmit some of the layers such that the resultant total number of layers to be transmitted is less or equal to the number of receiver antennas. In an embodiment, the layers that are not transmitted with the alternate transmission technique may be transmitted in different T/F resources.

Access Nodes

Figure 15:
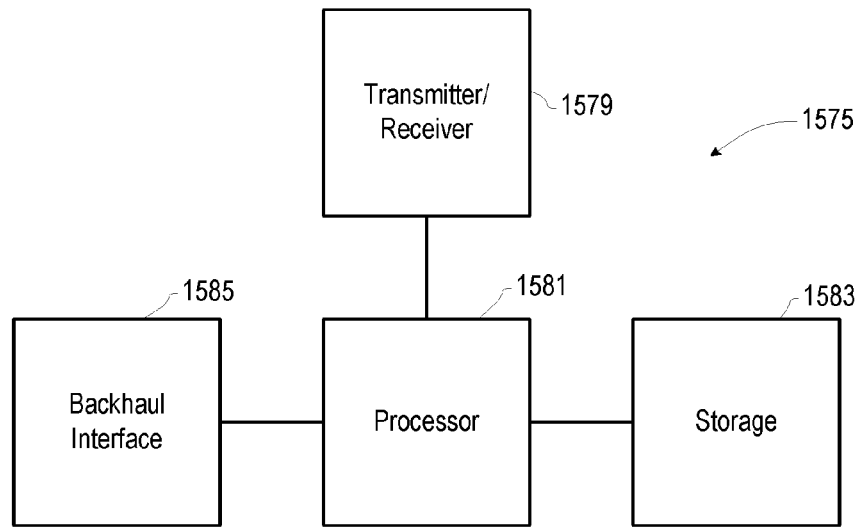
FIG. 15 a functional block diagram of an access node.

FIG. 15 is a functional block diagram of an access node 1575. In various embodiments, the access node 1575 may be a mobile WiMAX base station, an LTE evolved Node B (eNB or eNodeB), or other wireless base station or access node of various form factors. The various access nodes described above may be provided, for example, by access node 1575. Access node 1575 includes a processor 1581 that is coupled to a transmitter-receiver (transceiver) 1579, a backhaul interface 1585, and storage 1583.

Transmitter-receiver 1579 is configured to transmit and receive communications wirelessly with other devices. Access node 1575 generally includes one or more antennae for transmission and reception of radio signals. The communications of transmitter-receiver 1579 may be with one or more terminals.

Backhaul interface 1585 provides communication between the access node 1575 and a core network. This communication may include communications directly or indirectly (through intermediate devices) with other access nodes, for example to implement the LTE X2 interface. Communications received via the transmitter-receiver 1579 may be transmitted, after processing, on the backhaul connection via backhaul interface 1585. Similarly, communication received from the backhaul connection via backhaul interface 1585 may be transmitted by the transmitter-receiver 1579. Although the access node 1575 of FIG. 15 is shown with a single backhaul interface 1585, other embodiments of the access node 1575 may include multiple backhaul interfaces. Similarly, the access node 1575 may include multiple transmitter-receivers. In such a scenario, the multiple backhaul interfaces and transmitter-receivers may operate according to different protocols. Communications originating within the access node 1575, such as communications with other access nodes, may be transmitted on one or more backhaul connections by backhaul interface 1585. Similarly, communications destined for access node 1575 may be received from one or more backhaul connections via backhaul interface 1585.

Processor 1581 can process communications being received and transmitted by the access node 1575. Storage 1583 stores data for use by the processor 1581. Storage 1583 may also be used to store computer readable instructions for execution by processor 1581. The computer readable instructions can be used by access node 1575 for accomplishing the various functions of access node 1575. In an aspect, storage 1583, or parts of storage 1583, may be considered a non-transitory machine readable medium. For concise explanation, access node 1575 or aspects of access node 1575 are described as having certain functionality. It will be appreciated that in some embodiments, this functionality is accomplished by processor 1581 in conjunction with storage 1583, transmitter-receiver 1579, and backhaul interface 1585. Furthermore, in addition to executing instructions, processor 1581 may include specific purpose hardware to accomplish some functions.

Terminals

Figure 16:
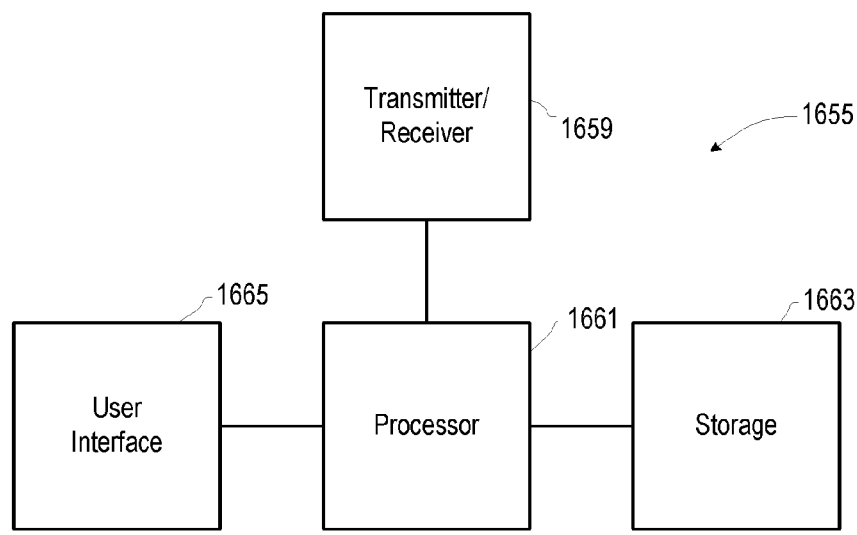
FIG. 16 is a functional block diagram of a terminal.

FIG. 16 is a functional block diagram of a terminal 1655. In various embodiments, terminal 1655 may be a mobile WiMAX subscriber station, an LTE user equipment, or other wireless terminal node of various form factors. The various terminals described above may be provided, for example, by terminal 1655 of FIG. 16. Terminal 1655 includes a processor 1661 that is coupled to a transmitter-receiver (transceiver) 1659, a user interface 1665, and storage 1663.

Transmitter-receiver 1659 is configured to transmit and receive communications with other devices. For example, transmitter-receiver 1659 may communicate with access node 1575 of FIG. 15 via its transmitter-receiver 1579. Terminal 1655 generally includes one or more antennas for transmission and reception of radio signals. Although terminal 1655 of FIG. 16 is shown with a single transmitter-receiver 1659, other embodiments of terminal 1655 may include multiple transmitter-receivers. In such a scenario, the multiple transmitter-receivers may operate according to different protocols.

Terminal 1655, in many aspects, provides data to and receives data from a person (user). Accordingly, terminal 1655 includes user interface 1665. User interface 1665 includes functionality for communicating with a person. User interface 1665, in an aspect, includes a speaker and a microphone for voice communications with the user, a screen for providing visual information to the user, and a keypad for accepting alphanumeric commands and data from the user. In some aspects, a touch screen may be used in place of or in combination with the keypad to allow graphical inputs in addition to alphanumeric inputs. In an alternate aspect, user interface 1665 includes a computer interface, for example, a universal serial bus (USB) interface, to interface terminal 1655 to a computer. For example, terminal 1655 may be in the form of a dongle that can be connected to a notebook computer via user interface 1665. The combination of computer and dongle may also be considered a terminal node. User interface 1665 may have other configurations and include functions such as vibrators, cameras, and lights.

Processor 1661 can process communications being received and transmitted by terminal 1655. Processor 1661 can also process inputs from and outputs to user interface 1665. Storage 1663 stores data for use by processor 1661. Storage 1663 may also be used to store computer readable instructions for execution by processor 1661. The computer readable instructions may be used by terminal 1655 for accomplishing the various functions of terminal 1655. In an embodiment, storage 1663, or parts of storage 1663, may be considered a non-transitory machine readable medium. For concise explanation, terminal 1655 or aspects of terminal 1655 are described as having certain functionality. It should be appreciated that in some aspects, this functionality is accomplished by processor 1661 in conjunction with storage 1663, transmitter-receiver 1659, and user interface 1665. Furthermore, in addition to executing instructions, processor 1661 may include specific purpose hardware to accomplish some functions.

As described herein, various systems, devices and methods are described as working to optimize, maximize, or minimize particular parameters, functions, or operations. This use of these terms does not necessarily mean to be taken in an abstract theoretical or global sense. Rather, the systems, devices, and methods may work to improve performance using algorithms that are expected to improve performance in at least many common cases. For example, the systems and methods may work to optimize, maximize, or minimize performance judged by particular functions or criteria. Similar terms like minimize or maximize are used in a like manner.

Those of skill will appreciate that the various illustrative logical blocks, modules, units, and algorithm steps described in connection with the aspects disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, or block without departing from the invention. Similarly, steps of the various processes may be performed concurrently or the processes may be modified by adding, omitting, reordering, or altering steps.

The various illustrative logical blocks, units, steps and modules described in connection with the aspects disclosed herein can be implemented or performed with a processor, such as a general purpose processor, a multi-core processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the aspects disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC. Additionally, device, blocks, or modules that are described as coupled may be coupled via intermediary device, blocks, or modules. Similarly, a first device may be described a transmitting data to (or receiving from) a second device when there are intermediary devices that couple the first and second device and also when the first device is unaware of the ultimate destination of the data.

The above description of the disclosed aspects is provided to enable any person skilled in the art to make or use the invention. Various modifications to these aspects will be readily apparent to those skilled in the art, and the generic principles described herein can be applied to other aspects. Thus, it is to be understood that the description and drawings presented herein represent exemplary aspects of the invention and are therefore representative of the subject matter that is broadly contemplated by the present invention. It is further understood that the scope of the present invention fully encompasses other aspects that may become obvious to those skilled in the art and that the scope of the present invention is not limited by the specific disclosed aspects.

What is claimed is:

1. A method for transmitting a plurality of layers from a transmitting device having a plurality of transmitter chains to a receiving device having a plurality of receiver antennas, the method comprising:
   determining,
      for each transmitter chain of the plurality of transmitter chains,
   a set of mapped constellations by applying a set of mapping options, each mapping option associated with the respective transmitter chain to a signal constellation associated with the respective transmitter chain;
   determining,
      for each receiver antenna of the plurality of receiver antennas,
      for each transmitter chain of the plurality of transmitter chains, and
      for each mapping option of the set of mapping options associated with the respective transmitter chain,
   estimated received constellations using the set of mapped constellations associated with the respective transmitter chain and an estimated channel transfer function between the respective transmitter chain and the respective receiver antenna;
   determining a set of mapping combinations, each mapping combination including one mapping option of the set of mapping options associated with each transmitter chain of the plurality of transmitter chains;
   determining,
      for each receiver antenna of the plurality of receiver antennas, a set of combined estimated received constellations, each combined estimated received constellation being a combination of the estimated received constellations associated with one of the mapping combinations;
   determining,
      for each receiver antenna of the plurality of receiver antennas, a distance metric for each combined estimated received constellation associated with the respective receiver antenna;
   determining a set of blended metrics, each blended metric associated with one of the mapping combinations, each blended metric based on the distance metric for each receiver antenna of the plurality of receiver antennas associated with the respective mapping combination;
   determining a transmission format using the set of blended metrics; and
   transmitting from the plurality of transmitter chains using the determined transmission format.

2. The method of claim 1, wherein determining the transmission format includes selecting one mapping combination of the set of mapping combinations based on the set of blended metrics, and
   wherein transmitting from the plurality of transmitter chains includes each transmitter chain of the plurality of transmitter chains using the mapping option associated with the respective transmitter chain in the selected mapping combination.

3. The method of claim 1, wherein at least one mapping option of the set of mapping options includes an amplitude scaling value.

4. The method of claim 3, wherein the at least one mapping option of the set of mapping options further includes a phase adjustment value.

5. The method of claim 1, wherein each combined estimated received constellation is a vector summation of the estimated received constellations associated with one of the mapping combinations.

6. The method of claim 1, wherein at least one of the distance metrics is a minimum Euclidean distance between constellation points in the combined estimated received constellation associated with the respective receiver antenna.

7. The method of claim 1, wherein at least one of the distance metrics is a minimum absolute-value based distance between constellation points in the combined estimated received constellation associated with the respective receiver antenna.

8. The method of claim 1, wherein at least one of the distance metrics is an average distance between all pairs of constellation points in the combined estimated received constellation associated with the respective receiver antenna.

9. The method of claim 1, wherein each blended metric of the set of blended metrics is a sum of the distance metrics associated with the respective mapping combination.

10. The method of claim 1, wherein each blended metric of the set of blended metrics is a minimum of the distance metrics associated with the respective mapping combination.

11. The method of claim 1, wherein the set of mapping combinations includes all combinations of mapping options.

12. The method of claim 1, further comprising estimating the channel transfer function between each transmitter chain of the plurality of transmitter chains and each receiver antenna of the plurality of receiver antennas.

13. The method of claim 1, determining the transmission format is performed at the transmitting device.

14. The method of claim 1, further comprising communicating the transmission format to the receiving device.

15. The method of claim 1, wherein determining the transmission format includes:
   comparing a best blended metric of the set of blended metrics to a noise threshold; and
   determining, based on the comparison of the best blended metric to the noise threshold, whether to use the mapping combination associated with the best blended metric for transmitting from the plurality of transmitter chains.

16. The method of claim 15, wherein determining whether to use the mapping combination associated with the best blended metric for transmitting from the plurality of transmitter chains is further based on singular values of the estimated channel transfer function matrix described communications channels between the transmitter chains and the receiver antennas.

17. A method for transmitting a plurality of layers from a plurality of transmitters having a plurality of transmitter chains having a plurality of transmitter antennas to a receiving device having a plurality of receiver antennas, the method comprising:
   determining a set of candidate transmission arrangements, each candidate transmission arrangement specifying a combination of layers, transmitters, transmitter chains, and transmitter antennas;

for each candidate transmission arrangement:
  determining a set of mapping combinations, each mapping combination applicable to the respective candidate transmission arrangement,
  determining, for each receiver antenna of the plurality of receiver antennas, a combined estimated received signal constellation associated each mapping combination,
  determining, for each receiver antenna of the plurality of receiver antennas, a distance metric for each combined estimated received signal constellation associated with the respective receiver antenna,
  determining, for each mapping combination, a blended metric based on the distance metric for each receiver antenna of the plurality of receiver antennas associated with the respective mapping combination, and
  selecting a best one of the blended metrics;
selecting one of the candidate transmission arrangements based on the selected blended metrics associated with each candidate transmission arrangement; and
transmitting using the combination of layers, transmitters, transmitter chains, and transmitter antennas associated with the selected candidate transmission arrangement and the mapping combination associated with the selected blended metric associated with the selected candidate transmission arrangement.

18. A transmitter for communicating with a receiving device having a plurality of receiver antennas, comprising:
  a plurality of transmitter chains for transmitting a plurality of layers;
  a plurality of antenna coupled to the transmitter chains; and
  a processor configured to
    determine, for each transmitter chain of the plurality of transmitter chains, a set of mapped constellations by applying a set of mapping options, each mapping option associated with the respective transmitter chain to a signal constellation associated with the respective transmitter chain;
    determine, for each receiver antenna of the plurality of receiver antennas, for each transmitter chain of the plurality of transmitter chains, and for each mapping option of the set of mapping options associated with the respective transmitter chain, estimated received constellations using the set of mapped constellations associated with the respective transmitter chain and an estimated channel transfer function between the respective transmitter chain and the respective receiver antenna;
    determine a set of mapping combinations, each mapping combination including one mapping option of the set of mapping options associated with each transmitter chain of the plurality of transmitter chains;
    determine, for each receiver antenna of the plurality of receiver antennas, a set of combined estimated received constellations, each combined estimated received constellation being a combination of the estimated received constellations associated with one of the mapping combinations;
    determine, for each receiver antenna of the plurality of receiver antennas, a distance metric for each combined estimated received constellation associated with the respective receiver antenna;
    determine a set of blended metrics, each blended metric associated with one of the mapping combinations, each blended metric based on the distance metric for each receiver antenna of the plurality of receiver antennas associated with the respective mapping combination; and
    determine a transmission format using the set of blended metrics, wherein the transmitter chains transmit using the determined transmission format.

* * * * *